United States Patent
Johnson

(10) Patent No.: US 12,182,218 B2
(45) Date of Patent: Dec. 31, 2024

(54) SMART PHONE FOR CONTROLLING METADATA ASSOCIATED WITH EXPORTED IMAGE DATA AND METHODS FOR USE THEREWITH

(71) Applicant: Deacon Johnson, San Diego, CA (US)

(72) Inventor: Deacon Johnson, San Diego, CA (US)

(*) Notice: Subject to any disclaimer, the term of this patent is extended or adjusted under 35 U.S.C. 154(b) by 0 days.

(21) Appl. No.: 18/755,103

(22) Filed: Jun. 26, 2024

(65) Prior Publication Data
US 2024/0346100 A1    Oct. 17, 2024

Related U.S. Application Data

(63) Continuation of application No. 18/242,111, filed on Sep. 5, 2023, which is a continuation of application
(Continued)

(51) Int. Cl.
*G06F 16/00* (2019.01)
*G06F 3/048* (2013.01)
(Continued)

(52) U.S. Cl.
CPC ............ *G06F 16/954* (2019.01); *G06F 3/048* (2013.01); *G06F 3/0482* (2013.01); *G06F 3/0484* (2013.01); *G06F 21/16* (2013.01); *G06F 21/60* (2013.01); *G06F 21/6218* (2013.01); *G06F 21/6245* (2013.01); *G06F 40/197* (2020.01);
(Continued)

(58) Field of Classification Search
None
See application file for complete search history.

(56) References Cited

U.S. PATENT DOCUMENTS

| | | |
|---|---|---|
| 5,832,495 A | 11/1998 | Gustman |
| 5,920,861 A | 7/1999 | Hall |

(Continued)

OTHER PUBLICATIONS

Batch Exif Tag Remover for Windows—ExifCleaner; http://web.archive.org/web/20110716164445/http://www.superutils.com/products/exifcleaner/; Jul. 16, 2011.
(Continued)

*Primary Examiner* — Farhan M Syed
(74) *Attorney, Agent, or Firm* — Garlick & Markison; Bruce E. Stuckman

(57) ABSTRACT

A smart phone and method are disclosed for controlling metadata associated with content on an electronic device that includes displaying interface screens for user entry of metadata control instructions, accepting user instructions, modifying metadata of applicable content, and associating the modified metadata with the applicable content. The system can export and/or store the applicable content along with modified metadata. The system can automatically modify metadata according to one or more profiles. Relevant profiles can be determined based on the export mechanism, destination or type of content. The system can display metadata for user modification. The content can include photos, videos or other content. The system can display metadata and geolocation indicators for each content item that indicate whether that item has associated metadata and geolocation information. The user can selectively modify metadata of selected content.

20 Claims, 11 Drawing Sheets

Related U.S. Application Data

No. 17/582,541, filed on Jan. 24, 2022, now Pat. No. 11,748,432, which is a continuation of application No. 16/545,523, filed on Aug. 20, 2019, now Pat. No. 11,232,165, which is a continuation of application No. 15/640,778, filed on Jul. 3, 2017, now Pat. No. 10,387,518, which is a continuation of application No. 15/082,842, filed on Mar. 28, 2016, now Pat. No. 9,697,293, which is a continuation of application No. 14/500,229, filed on Sep. 29, 2014, now Pat. No. 9,298,943, which is a continuation of application No. 13/481,188, filed on May 25, 2012, now Pat. No. 8,849,819.

(60) Provisional application No. 61/515,613, filed on Aug. 5, 2011.

(51) Int. Cl.
  *G06F 3/0482* (2013.01)
  *G06F 3/0484* (2022.01)
  *G06F 16/954* (2019.01)
  *G06F 21/16* (2013.01)
  *G06F 21/60* (2013.01)
  *G06F 21/62* (2013.01)
  *G06F 40/197* (2020.01)
  *H04L 67/306* (2022.01)
  *G06F 21/10* (2013.01)
  *H04W 4/02* (2018.01)

(52) U.S. Cl.
  CPC ........ *H04L 67/306* (2013.01); *G06F 21/1062* (2023.08); *G06F 21/1066* (2023.08); *H04W 4/025* (2013.01)

(56) References Cited

U.S. PATENT DOCUMENTS

| | | | |
|---|---|---|---|
| 6,055,543 A | 4/2000 | Christensen | |
| 6,233,578 B1 | 5/2001 | Machihara | |
| 6,463,433 B1 | 10/2002 | Baclawski | |
| 6,615,252 B1 | 9/2003 | Toshio | |
| 6,671,695 B2 | 12/2003 | McFadden | |
| 6,686,970 B1 | 2/2004 | Windle | |
| 6,763,370 B1 | 7/2004 | Schmeidler | |
| 7,089,319 B2 | 8/2006 | Lysenko | |
| 7,096,226 B2 | 8/2006 | Brock | |
| 7,149,545 B2 | 12/2006 | Hurst | |
| 7,153,137 B2 | 12/2006 | Altenhofen | |
| 7,181,523 B2 | 2/2007 | Sim | |
| 7,249,382 B2 | 7/2007 | Kawell, Jr. | |
| 7,292,579 B2 | 11/2007 | Morris | |
| 7,308,489 B2 | 12/2007 | Weast | |
| 7,310,643 B2 | 12/2007 | Miller | |
| 7,349,890 B1 | 3/2008 | Pathak | |
| 7,409,405 B1 | 8/2008 | Masinter | |
| 7,421,449 B2 | 9/2008 | Williams | |
| 7,424,669 B2 | 9/2008 | Bhogal | |
| 7,441,092 B2 | 10/2008 | Lyon | |
| 7,447,857 B2 | 11/2008 | Lyon | |
| 7,448,080 B2 | 11/2008 | Karjala | |
| 7,464,058 B2 | 12/2008 | Yen | |
| 7,483,895 B2 | 1/2009 | Hysom | |
| 7,487,161 B2 | 2/2009 | Steuernagel | |
| 7,490,207 B2 | 2/2009 | Amarendran | |
| 7,490,340 B2 | 2/2009 | Hamzy | |
| 7,500,053 B1 | 3/2009 | Kavuri | |
| 7,509,345 B2 | 3/2009 | Despain | |
| 7,512,689 B2 | 3/2009 | Saint-Hilaire | |
| 7,533,061 B1 | 5/2009 | Cheng | |
| 7,533,107 B2 | 5/2009 | Gupta | |
| 7,536,291 B1 | 5/2009 | Vijayan Retnamma | |
| 7,543,232 B2 | 6/2009 | Easton, Jr. | |
| 7,587,602 B2 | 9/2009 | Rhoads | |
| 7,600,252 B2 | 10/2009 | Illowsky | |
| 7,627,580 B2 | 12/2009 | Fujii | |
| 7,650,621 B2 | 1/2010 | Thomas | |
| 7,684,902 B2 | 3/2010 | Igoe | |
| 7,685,248 B1 | 3/2010 | Fein | |
| 7,685,459 B1 | 3/2010 | De Spiegeleer | |
| 7,689,764 B1 | 3/2010 | De Spiegeleer | |
| 7,720,869 B2 | 5/2010 | Frieder | |
| 7,721,208 B2 | 5/2010 | Madden | |
| 7,721,313 B2 | 5/2010 | Barrett | |
| 7,739,411 B2 | 6/2010 | Messer | |
| 7,739,413 B2 | 6/2010 | Dewa | |
| 7,739,459 B2 | 6/2010 | Kottomtharayil | |
| 7,747,579 B2 | 6/2010 | Prahlad | |
| 7,761,476 B2 | 7/2010 | Miller | |
| 7,769,961 B2 | 8/2010 | Kottomtharayil | |
| 7,778,875 B2 | 8/2010 | Schauser | |
| 7,792,920 B2 | 9/2010 | Istvan | |
| 7,793,321 B2 | 9/2010 | Simms | |
| 7,797,019 B2 | 9/2010 | Friedmann | |
| 7,797,354 B2 | 9/2010 | Sattler | |
| 7,800,646 B2 | 9/2010 | Martin | |
| 7,801,864 B2 | 9/2010 | Prahlad | |
| 7,809,914 B2 | 10/2010 | Kottomtharayil | |
| 7,813,913 B2 | 10/2010 | Collins | |
| 7,818,160 B2 | 10/2010 | Collins | |
| 7,822,595 B2 | 10/2010 | Brunet | |
| 7,823,077 B2 * | 10/2010 | Kurtz | G06F 16/164 715/771 |
| 7,827,363 B2 | 11/2010 | Devassy | |
| 7,830,826 B2 | 11/2010 | Costa-Requena | |
| 7,836,053 B2 | 11/2010 | Naef, III | |
| 7,836,151 B2 | 11/2010 | Bellotti | |
| 7,836,174 B2 | 11/2010 | Lunde | |
| 7,840,344 B2 | 11/2010 | Sloo | |
| 7,840,537 B2 | 11/2010 | Gokhale | |
| 7,840,903 B1 | 11/2010 | Amidon | |
| 7,844,445 B2 | 11/2010 | Brunet | |
| 7,844,947 B2 | 11/2010 | Irving | |
| 7,849,059 B2 | 12/2010 | Prahlad | |
| 7,849,266 B2 | 12/2010 | Kavuri | |
| 7,870,092 B2 | 1/2011 | Scott | |
| 7,870,273 B2 | 1/2011 | Watson | |
| 7,870,282 B2 | 1/2011 | Jonsson | |
| 7,876,352 B2 | 1/2011 | Martin | |
| 7,877,328 B2 | 1/2011 | Tanaka | |
| 7,885,955 B2 | 2/2011 | Hull | |
| 7,890,609 B2 | 2/2011 | Shkedi | |
| 7,891,011 B1 | 2/2011 | Thenthiruperai | |
| 7,894,639 B2 | 2/2011 | Grim, III | |
| 7,895,598 B2 | 2/2011 | Eide | |
| 7,899,662 B2 | 3/2011 | Brunet | |
| 7,900,002 B2 | 3/2011 | Lyon | |
| 7,900,228 B2 | 3/2011 | Stark | |
| 7,920,759 B2 | 4/2011 | Hull | |
| 7,920,932 B2 | 4/2011 | Igoe | |
| 7,934,983 B1 | 5/2011 | Eisner | |
| 7,941,819 B2 | 5/2011 | Stark | |
| 7,945,439 B2 | 5/2011 | Asano | |
| 7,949,512 B2 | 5/2011 | Vijayan Retnamma | |
| 7,952,607 B2 | 5/2011 | Baker | |
| 7,953,706 B2 | 5/2011 | Prahlad | |
| 7,958,307 B2 | 6/2011 | Kavuri | |
| 7,962,404 B1 | 6/2011 | Metzger, II | |
| 7,962,452 B2 | 6/2011 | Anglin | |
| 7,962,642 B2 | 6/2011 | Ignatius | |
| 7,962,714 B2 | 6/2011 | Amarendran | |
| 7,962,937 B2 | 6/2011 | Cho | |
| 7,966,577 B2 | 6/2011 | Chaudhri | |
| 7,970,171 B2 | 6/2011 | Lookingbill | |
| 7,987,294 B2 | 7/2011 | Bryce | |
| 7,991,283 B2 | 8/2011 | Chen | |
| 7,991,778 B2 | 8/2011 | Hull | |
| 7,991,862 B2 | 8/2011 | Shibasaki | |
| 7,995,756 B1 | 8/2011 | Mckinney | |
| 7,996,418 B2 | 8/2011 | Weinstein | |
| 7,996,521 B2 | 8/2011 | Chamberlain | |
| 8,004,576 B2 | 8/2011 | Sharma | |

(56) References Cited

U.S. PATENT DOCUMENTS

| | | |
|---|---|---|
| 8,005,236 B2 | 8/2011 | Igoe |
| 8,005,272 B2 | 8/2011 | Grim, III |
| 8,005,831 B2 | 8/2011 | Hull |
| 8,010,531 B2 | 8/2011 | Ruiz-Velasco |
| 8,010,769 B2 | 8/2011 | Prahlad |
| 8,015,506 B2 | 9/2011 | Fleishman |
| 8,019,963 B2 | 9/2011 | Ignatius |
| 8,024,264 B2 | 9/2011 | Chaudhuri |
| 8,024,317 B2 | 9/2011 | Nair |
| 8,024,454 B2 | 9/2011 | Campbell |
| 8,032,409 B1 | 10/2011 | Mikurak |
| 8,032,508 B2 | 10/2011 | Martinez |
| 8,032,649 B2 | 10/2011 | Gupta |
| 8,032,718 B2 | 10/2011 | Kottomtharayil |
| 8,037,028 B2 | 10/2011 | Prahlad |
| 8,037,031 B2 | 10/2011 | Gokhale |
| 8,041,828 B2 | 10/2011 | Lee |
| 8,041,905 B2 | 10/2011 | Devassy |
| 8,050,972 B2 | 11/2011 | Schauser |
| 8,055,614 B1 | 11/2011 | Vaikar |
| 8,055,618 B2 | 11/2011 | Anglin |
| 8,055,640 B2 | 11/2011 | Park |
| 8,055,667 B2 | 11/2011 | Levy |
| 8,055,675 B2 | 11/2011 | Higgins |
| 8,055,708 B2 | 11/2011 | Chitsaz |
| 8,055,899 B2 | 11/2011 | Levy |
| 8,060,492 B2 | 11/2011 | Nair |
| 8,060,575 B2 | 11/2011 | Massand |
| 8,060,596 B1 | 11/2011 | Wootton |
| 8,068,677 B2 | 11/2011 | Varadarajan |
| 8,069,142 B2 | 11/2011 | Davis |
| 8,069,271 B2 | 11/2011 | Brunet |
| 8,073,263 B2 | 12/2011 | Hull |
| 8,074,042 B2 | 12/2011 | Kottomtharayil |
| 8,078,641 B2 | 12/2011 | Mao |
| 8,085,687 B2 | 12/2011 | Sasso |
| 8,085,990 B2 | 12/2011 | Ofek |
| 8,086,038 B2 | 12/2011 | Ke |
| 8,086,541 B2 | 12/2011 | Schauser |
| 8,086,651 B2 | 12/2011 | Thomas |
| 8,087,047 B2 | 12/2011 | Olague |
| 8,090,683 B2 | 1/2012 | Beaman |
| 8,095,566 B2 | 1/2012 | Thomas |
| 8,095,607 B2 | 1/2012 | Shenfield |
| 8,099,109 B2 | 1/2012 | Altman |
| 8,103,590 B2 | 1/2012 | Quoc |
| 8,107,975 B2 | 1/2012 | Friedmann |
| 8,108,778 B2 | 1/2012 | Athsani |
| 8,112,308 B1 | 2/2012 | Ho |
| 8,112,548 B2 | 2/2012 | Cui |
| 8,112,714 B2 | 2/2012 | Fleishman |
| 8,121,618 B2 | 2/2012 | Rhoads |
| 8,122,037 B2 | 2/2012 | McSheffrey |
| 8,131,680 B2 | 3/2012 | Prahlad |
| 8,131,725 B2 | 3/2012 | Prahlad |
| 8,131,964 B2 | 3/2012 | Retnamma |
| 8,140,570 B2 | 3/2012 | Ingrassia |
| 8,140,637 B2 | 3/2012 | Slater |
| 8,140,786 B2 | 3/2012 | Bunte |
| 8,144,921 B2 | 3/2012 | Ke |
| 8,145,598 B2 | 3/2012 | Beaman |
| 8,145,754 B2 | 3/2012 | Chamberlain |
| 8,146,132 B2 | 3/2012 | Igoe |
| 8,150,967 B2 | 4/2012 | King |
| 8,255,396 B2 | 8/2012 | Sandoval |
| 8,255,731 B1 | 8/2012 | Alsina |
| 8,260,266 B1 | 9/2012 | Amidon |
| 8,271,336 B2 | 9/2012 | Mikurak |
| 8,285,681 B2 | 10/2012 | Prahlad |
| 8,291,083 B2 | 10/2012 | Black |
| 8,341,141 B2 * | 12/2012 | Krislov .................. G06Q 50/18 707/707 |
| 8,468,244 B2 | 6/2013 | Redlich |
| 8,533,851 B2 | 9/2013 | Ginter |
| 8,560,366 B2 | 10/2013 | Mikurak |
| 8,645,991 B2 | 2/2014 | Mcintire |
| 8,655,878 B1 | 2/2014 | Kulkarni |
| 8,732,168 B2 * | 5/2014 | Johnson ................ G06F 3/0484 707/731 |
| 8,849,819 B2 * | 9/2014 | Johnson ................ G06F 21/60 707/731 |
| 2001/0014975 A1 | 8/2001 | Gordon |
| 2002/0001395 A1 * | 1/2002 | Davis ..................... G06F 21/10 705/317 |
| 2002/0026445 A1 | 2/2002 | Chica |
| 2002/0052849 A1 | 5/2002 | McCutchen |
| 2002/0072952 A1 | 6/2002 | Hamzy |
| 2002/0143791 A1 | 10/2002 | Levanon |
| 2003/0012403 A1 | 1/2003 | Rhoads |
| 2003/0046274 A1 | 3/2003 | Erickson |
| 2003/0093544 A1 | 5/2003 | Richardson |
| 2004/0022444 A1 * | 2/2004 | Rhoads ................. G06V 20/80 382/232 |
| 2004/0039754 A1 | 2/2004 | Harple, Jr. |
| 2004/0064351 A1 | 4/2004 | Mikurak |
| 2004/0078353 A1 | 4/2004 | Brock |
| 2004/0078575 A1 | 4/2004 | Morten |
| 2004/0083433 A1 * | 4/2004 | Takeya .................... G06F 16/93 715/269 |
| 2004/0123131 A1 * | 6/2004 | Zacks ................. H04N 1/32128 705/57 |
| 2004/0193609 A1 | 9/2004 | Phan |
| 2004/0210928 A1 | 10/2004 | Hamzy |
| 2004/0220791 A1 | 11/2004 | Lamkin |
| 2004/0220926 A1 | 11/2004 | Lamkin |
| 2004/0243634 A1 | 12/2004 | Levy |
| 2005/0058319 A1 | 3/2005 | Rhoads |
| 2005/0216524 A1 | 9/2005 | Gomes |
| 2005/0234844 A1 | 10/2005 | Ivanov |
| 2006/0004699 A1 | 1/2006 | Lehikoinen |
| 2006/0064720 A1 | 3/2006 | Istvan |
| 2006/0085750 A1 | 4/2006 | Easton, Jr. |
| 2006/0085825 A1 | 4/2006 | Istvan |
| 2006/0178918 A1 | 8/2006 | Mikurak |
| 2006/0224846 A1 | 10/2006 | Amarendran |
| 2006/0235871 A1 | 10/2006 | Trainor |
| 2007/0073837 A1 | 3/2007 | Johnson-McCormick |
| 2007/0097959 A1 | 5/2007 | Taylor |
| 2007/0162400 A1 | 7/2007 | Brew |
| 2007/0162459 A1 | 7/2007 | Desai |
| 2007/0180066 A1 * | 8/2007 | Sherwood ............. G06F 16/958 709/217 |
| 2007/0180386 A1 * | 8/2007 | Ballard ............... G06F 16/9577 715/744 |
| 2007/0198363 A1 | 8/2007 | Quoc |
| 2007/0198364 A1 | 8/2007 | Quoc |
| 2007/0198492 A1 | 8/2007 | Quoc |
| 2007/0208670 A1 | 9/2007 | Quoc |
| 2007/0250901 A1 | 10/2007 | McIntire |
| 2007/0266252 A1 * | 11/2007 | Davis ..................... G06F 21/10 713/176 |
| 2008/0005313 A1 | 1/2008 | Flake |
| 2008/0010605 A1 | 1/2008 | Frank |
| 2008/0059519 A1 | 3/2008 | Grifftih |
| 2008/0183826 A1 | 7/2008 | Notani |
| 2008/0189283 A1 | 8/2008 | Quoc |
| 2008/0192736 A1 | 8/2008 | Jabri |
| 2008/0215744 A1 | 9/2008 | Shenfield |
| 2008/0301727 A1 | 12/2008 | Cristofalo |
| 2009/0055417 A1 | 2/2009 | Hannuksela |
| 2009/0063419 A1 | 3/2009 | Nurminen |
| 2009/0099853 A1 | 4/2009 | Lemelson |
| 2009/0151004 A1 | 6/2009 | Cohen |
| 2009/0158318 A1 | 6/2009 | Levy |
| 2009/0204885 A1 | 8/2009 | Ellsworth |
| 2009/0217352 A1 | 8/2009 | Shen |
| 2009/0234784 A1 * | 9/2009 | Buriano ................ G06F 16/337 707/999.005 |
| 2009/0254572 A1 | 10/2009 | Redlich |
| 2010/0046842 A1 | 2/2010 | Conwell |
| 2010/0048242 A1 | 2/2010 | Rhoads |
| 2010/0076976 A1 | 3/2010 | Sotirov |
| 2010/0082635 A1 | 4/2010 | Elsner |

(56) References Cited

U.S. PATENT DOCUMENTS

| | | | | |
|---|---|---|---|---|
| 2010/0153407 | A1* | 6/2010 | Krislov | G06Q 50/18 |
| | | | | 707/831 |
| 2010/0153410 | A1 | 6/2010 | Jin | |
| 2010/0223259 | A1 | 9/2010 | Mizrahi | |
| 2010/0228773 | A1 | 9/2010 | Loughery, III | |
| 2010/0268628 | A1 | 10/2010 | Pitkow | |
| 2010/0274816 | A1 | 10/2010 | Guzik | |
| 2010/0323730 | A1 | 12/2010 | Karmarkar | |
| 2010/0332488 | A1 | 12/2010 | Horvitz | |
| 2010/0332958 | A1 | 12/2010 | Weinberger | |
| 2011/0018998 | A1 | 1/2011 | Guzik | |
| 2011/0029538 | A1 | 2/2011 | Harple, Jr. | |
| 2011/0035284 | A1 | 2/2011 | Moshfeghi | |
| 2011/0041153 | A1 | 2/2011 | Simon | |
| 2011/0072036 | A1 | 3/2011 | Agsen | |
| 2011/0079639 | A1 | 4/2011 | Khan | |
| 2011/0115915 | A1 | 5/2011 | Velusamy | |
| 2011/0154382 | A1 | 6/2011 | Chow | |
| 2011/0167078 | A1* | 7/2011 | Benjamin | G06Q 10/107 |
| | | | | 715/779 |
| 2011/0173565 | A1 | 7/2011 | Ofek | |
| 2011/0209221 | A1 | 8/2011 | Hanson | |
| 2011/0219229 | A1 | 9/2011 | Cholas | |
| 2011/0251868 | A1 | 10/2011 | Mikurak | |
| 2011/0256886 | A1 | 10/2011 | Velusamy | |
| 2011/0258526 | A1 | 10/2011 | Supakkul | |
| 2011/0280497 | A1 | 11/2011 | Berger | |
| 2011/0283210 | A1 | 11/2011 | Berger | |
| 2011/0310981 | A1 | 12/2011 | Narasimhan | |
| 2012/0039546 | A1 | 2/2012 | Berger | |
| 2012/0063736 | A1 | 3/2012 | Simmons | |
| 2012/0066573 | A1 | 3/2012 | Berger | |
| 2012/0072878 | A1 | 3/2012 | Dittmann | |
| 2012/0082401 | A1 | 4/2012 | Berger | |
| 2012/0084731 | A1 | 4/2012 | Filman | |
| 2012/0190386 | A1* | 7/2012 | Anderson | G01S 19/14 |
| | | | | 455/456.3 |
| 2012/0198041 | A1 | 8/2012 | Black | |
| 2012/0198042 | A1 | 8/2012 | Dunbar | |
| 2012/0198071 | A1 | 8/2012 | Black | |
| 2012/0221741 | A1 | 8/2012 | Fröjdh | |
| 2012/0310889 | A1 | 12/2012 | McNeil | |
| 2012/0310894 | A1 | 12/2012 | Freedman | |
| 2012/0310896 | A1 | 12/2012 | Freedman | |
| 2012/0311280 | A1 | 12/2012 | Schmidt | |
| 2012/0311366 | A1 | 12/2012 | Alsina | |
| 2013/0014169 | A1* | 1/2013 | Sansom | G06F 16/735 |
| | | | | 725/48 |
| 2013/0028751 | A1 | 1/2013 | Rai | |
| 2013/0036363 | A1 | 2/2013 | Johnson | |
| 2013/0036364 | A1 | 2/2013 | Johnson | |
| 2013/0238751 | A1 | 9/2013 | Raleigh | |
| 2013/0238761 | A1 | 9/2013 | Raleigh | |
| 2013/0238762 | A1 | 9/2013 | Raleigh | |
| 2013/0238777 | A1 | 9/2013 | Raleigh | |

OTHER PUBLICATIONS

Digital Confidence; BatchPurifier; http://web.archive.org/web/20110710125004/http://digitalconfidence.com/BatchPurifier.html; Jul. 10, 2011.
Digital Confidence; ConfidentSend; http://web.archive.org/web/20110710125039/http://digitalconfidence.com/ConfidentSend.html; Jul. 10, 2011.
Digital Confidence; DataDistiller Engine; http://web.archive.org/web/20110710125104/http://digitalconfidence.com/DataDistiller-Metadata-Removal-Engine.html; Jul. 10, 2011.
Digital Confidence; Hidden Data & Metadata Removal Software Solutions; http://web.archive.org/web/20110710125756/http://digitalconfidence.com/; Jul. 10, 2011.
Digital Confidence; Hidden Data and Metadata FAQ; http://web.archive.org/web/20110710125550/http://digitalconfidence.com/Hidden-data-and-Metadata-FAQ.html; Jul. 10, 2011.
Digital Confidence; MailValve EX; http://web.archive.org/web/20110710125751/http://digitalconfidence.com/MailValveEX.html; Jul. 10, 2011.
Digital Confidence; MailValveGX; http://web.archive.org/web/20110710125536/http://digitalconfidence.com/MailValve.html; Jul. 10, 2011.
Digital Confidence; MetadataFox; http://web.archive.org/web/20110710125007/http://digitalconfidence.com/MetadataFox.html; Jul. 10, 2011.
Digital Confidence; MetadataTouch; http://web.archive.org/web/20110710124935/http://digitalconfidence.com/MetadataTouch.html; Jul. 10, 2011.
Exif Jpeg Header Manipulation Tool; http://web.archive.org/web/20110721211010/http://www.sentex.net/~mwandel/jhead/; Jul. 21, 2011.
Exif Jpeg header manipulation tool; http://www.web.archive.org/web/20110429213114/http://www.sentex.net/~mwandel/head/; Apr. 29, 2011.
Exifclean, Pictures Library, screenshot; http://superutils.com/products/1-exifcleaner/; Dec. 18, 2012.
Exifclean, Pictures Library, screenshot; http://www.superutils.com/products/2-exifcleaner/; Dec. 18, 2012.
Exifclean, Pictures Library, screenshot; http://www.superutils.com/products/3-exifcleaner/; Dec. 18, 2012.
Exifclean, Pictures Library, screenshot; http://www.superutils.com/products/4-exifcleaner/; Dec. 18, 2012.
Exifclean, Pictures Library, screenshot; http://www.superutils.com/products/5-exifcleaner/; Dec. 18, 2012.
Exifclean, Pictures Library, screenshot; http://www.superutils.com/products/6-exifcleaner/; Dec. 18, 2012.
Geotag Security; Get Smart With GeoTags: Secure Your Home and Your Whereabouts; http://web.archive.org/web/20100924124940/http://geotagsecurity.com/secure-home-and-whereabouts/; Sep. 24, 2010.
Geotag Security; How it Works; http://web.archive.org/web/20100905033O1/http://www.geotagsecurity.com/how-it-works/; Sep. 5, 2010.
Geotag Security; How to Set Up Geotag Security PRO; http://web.archive.org/web/20100922180501/http://www.geotagsecurity.com/how-to-set-up-geotag-security-pro/; Sep. 22, 2010.
Geotag Security; Protect Your Car From Theft; http://web.archive.org/web/2010094124936/http://www.geotagsecurity.com/protect-your-car-from-theft/; Sep. 24, 2010.
Geotag Security; Using GeoTags Judiciously; http://web.archive.org/web/20100922180537/http://www.geotagsecurity.com/using-geotags-judiciously/; Sep. 22, 2010.
Geotag Security; What is Geotag Security and How it Helps to Protect your Family; http://web.archive.org/web/20100922180447/http://www.geotagsecurity.com/geotag-security-and-family-protection/; Sep. 22, 2010.
Geotag Security; What is Geotag Security and How it Helps to Protect Your Family; http://web.archive.org/web/20110710102218/http://www.geotagsecurity.com/; Jul. 10, 2011.
Hartung et al., "Digital Rights Management and Watermarking of Multimedia Content for M-Commerce Applications," Selected Papers From ISS2000, IEEE Communications Magazine, pp. 78-84, Nov. 2000.
IRFANVIEW; http://web.archive.org/web/20100101183326/http://www.irfanview.com/; Jan. 1, 2010.
IRFANVIEW; http://web.archive.org/web/20100804135432/http://www.irfanview.com/; Aug. 4, 2010.
JHEAD; http://web.archive.org/web/20110722200658/http://www.sentex.net/~mwandel/jhead/usage.html; Jul. 22, 2011.
Phil Harvey, EifTool by Phil Harvey; http://www.web.archive.org/web/20100161 72532/http://www.sno.phy.queensu.ca/~phil/exiftool/; Jan. 6, 2010.
Phil Harvey, ExifTool by Phil Harvey; http://www.web.archive.org/web/20110718015807/http://www.sno.phy.queensu.ca/~phil/exiftool/; Jul. 18, 2011.
Phil Harvey; The Sudbury Neutrino Observatory; exiftool Application Documentation; http://web.archive.org/web/20110607214617/http://www.sno.phy.queensu.ca/~phil/exiftool/exiftool_pod.html; Jun. 7, 2011.

(56) References Cited

OTHER PUBLICATIONS

Phil Harvey; The Sudbury Neutrino Observatory; ExifTool by Phil Harvey; http://web.archive.org/web/20110718021815/http://www.sno.phy.queensu.ca/~phil/exiftool/; Jul. 18, 2011.

Phil Harvey; The Sudbury Neutrino Observatory; ExifTool FAQ; http://web.archive.org/web/20110607214232/http://www.sno.phy.queensu.ca/~phil/exiftool/faq.html; Jun. 7, 2011.

Phil Harvey; The Sudbury Neutrino Observatory; Geotagging with ExifTool; http://web.archive.org/web/20110607214226/http://www.sno.phy.queensu.ca/~phil/exiftool/geotag.html; Jun. 7, 2011.

Phil Harvey; The Sudbury Neutrino Observatory; The Image::ExifTool Perl Lirary Module; http://web.archive.org/web/20110718015936/http://www.sno.phy.queensu.ca/~phil/exiftool/ExifTool.html; Jul. 18, 2011.

Phil Harvey; The Sudbury Neutrino Observatory; Writing "FileName" and "Directory" tags; http://web.archive.org/web/20100202082241/http://www.sno.phy.queensu.ca/~phil/exiftool/filename.html; Feb. 2, 2010.

The Dangers of metadata / Hidden Data; http://www.web.archive.org/web/20100619125524/http://www.workshare.com/solutions/risk/metadata-hidden-data.aspx; Jun. 19, 2010.

Workshare Professional; http://www.web.archive.org/web/20101103064856/http://workshare.com/products/wsprofessional/; Nov. 5, 2010.

Workshare Protect—Features and Benefits; http://http://web.archive.org/web/20101115153316/http://www.workshare.com/products/wsprotect/protect_features.aspx; Nov. 15, 2010.

Workshare Protect—Features; http://web.archive.org/web/20101115131731/http://www.workshare.com/products/wsprotect/; Nov. 15, 2010.

Workshare Protect Server—Features; http://web.archive.org/web/20101104122158/http://www.workshare.com/products/protect-server/protect-server-features.aspx; Nov. 4, 2010.

Workshare Protect Server; http://web.archive.org/web/20101115145020/http://www.workshare.com/products/protect-server/; Nov. 15, 2010.

\* cited by examiner

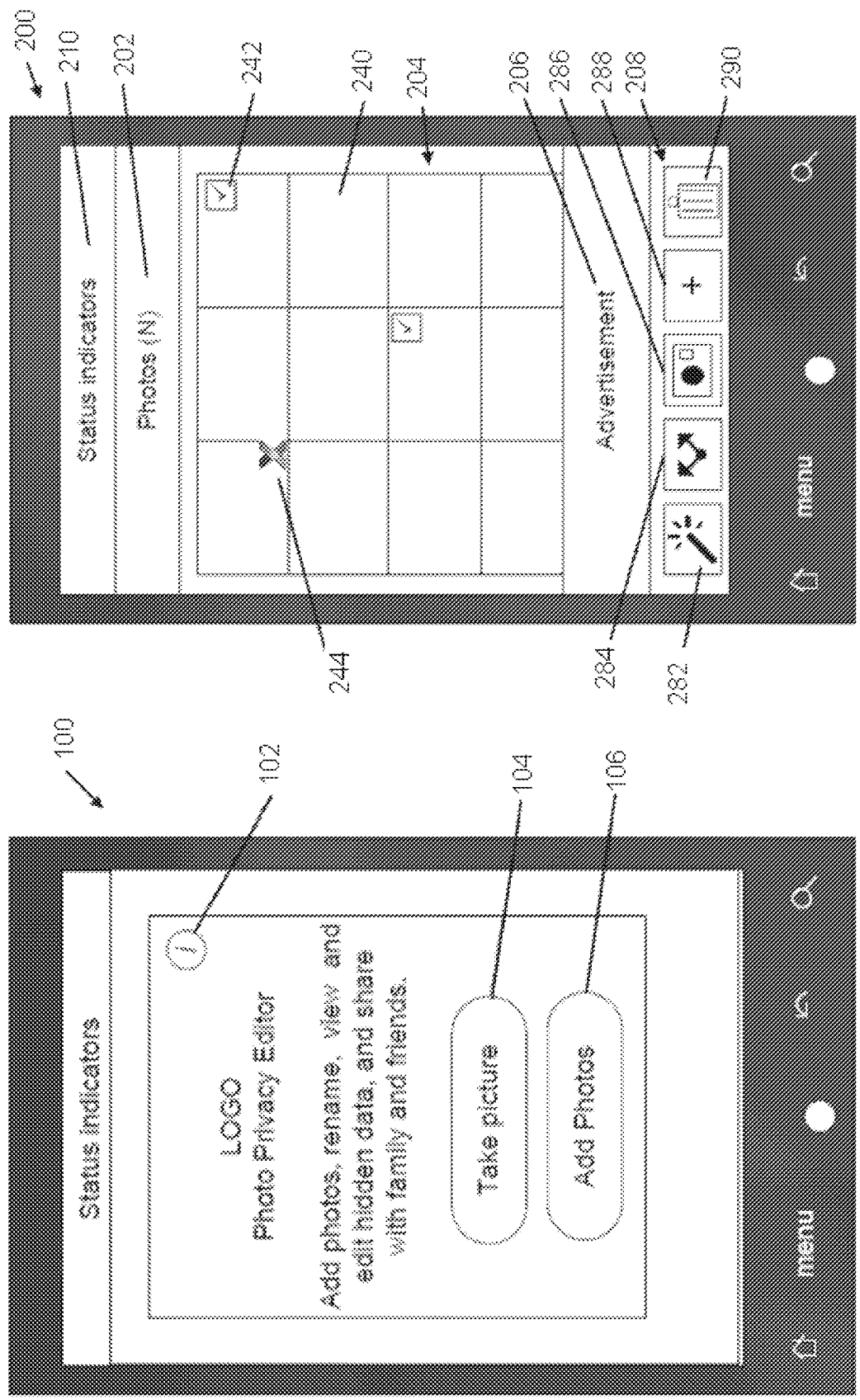

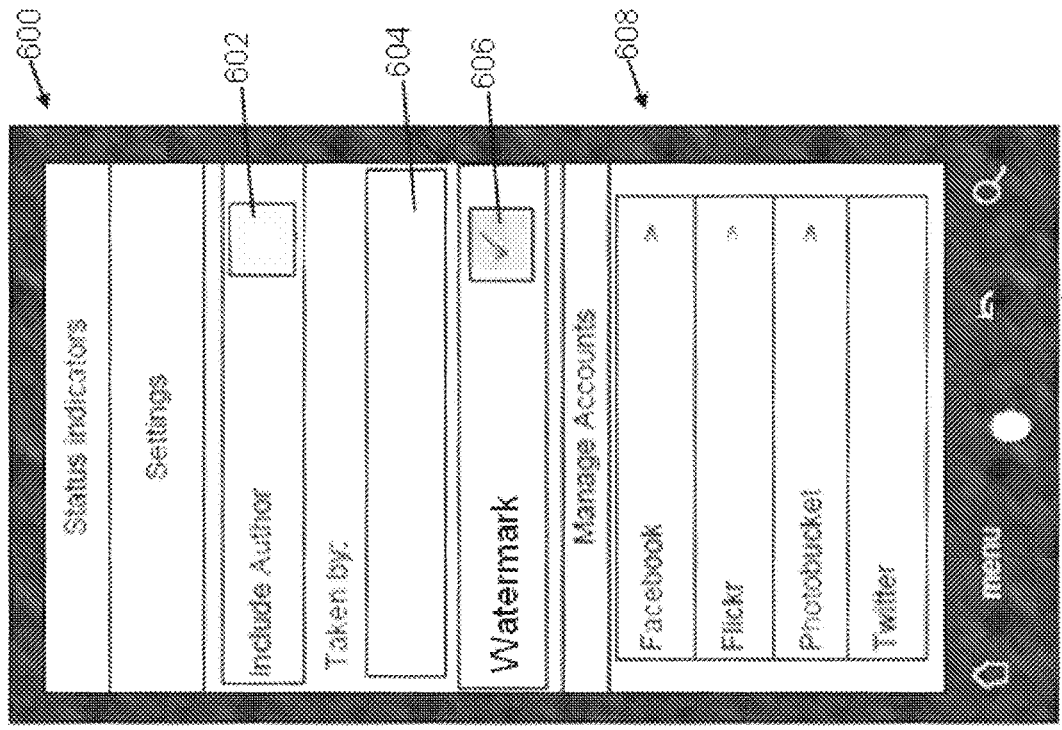

Camera:
- Make: Apple
- Model: iPhone
- Software version: 4.0.1
- Image Description: Back Camera
- X Resolution: 72
- Y Resolution: 72
- YCbCr Positioning: 1

Title:
- File Name: IMG_1296

Artist:
- Taken By: iPhone Name
- Copyright: D's iPhone 2010

Date & Time:
- Date: 2010:08:06
- Time: 15:55:48

GPS Data:
- Latitude: 34.0086666666667
- Latitude Ref: N
- Longitude: 118.057866663667
- Longitude Ref: W
- Img Direction: 96.090765
- Img Direction Ref: T
- Time Stamp: 15:55:42.68

Image:
- Pixel Height: 1936
- Pixel Width: 2592
- Orientation: 6
- Depth: 8
- DPI Width: 72
- DPI Height: 72
- Color Model: RGB Image Taking Conditions:
- EXIF Version: 2.2.1
- Date Digitized: 2010:08:06
- Time Digitized: 15:55:48
- Date Original: 2010:08:06
- Time Original: 15:55:42:48
- Aperture: 2.526069
- Color Space: 1
- Exposure Mode: 0
- Exposure Program: 2
- Exposure Time: 0.0063333334
- F Number: 2.4
- Flash: 24
- Flash Pix Version: 1.0
- Focal Length: 3.85
- ISO Speed Ratings: 125
- Metering Mode: 1
- Pixel X Dimension: 0
- Pixel Y Dimension: 0
- Scene Capture Type: 0
- Sensing Method: 2
- Sharpness: 2
- Shutter Speed Value: 6.909042
- Subject Area: 1295, 967, 699, 696
- White Balance: 0

Other Metadata:

Figure 7

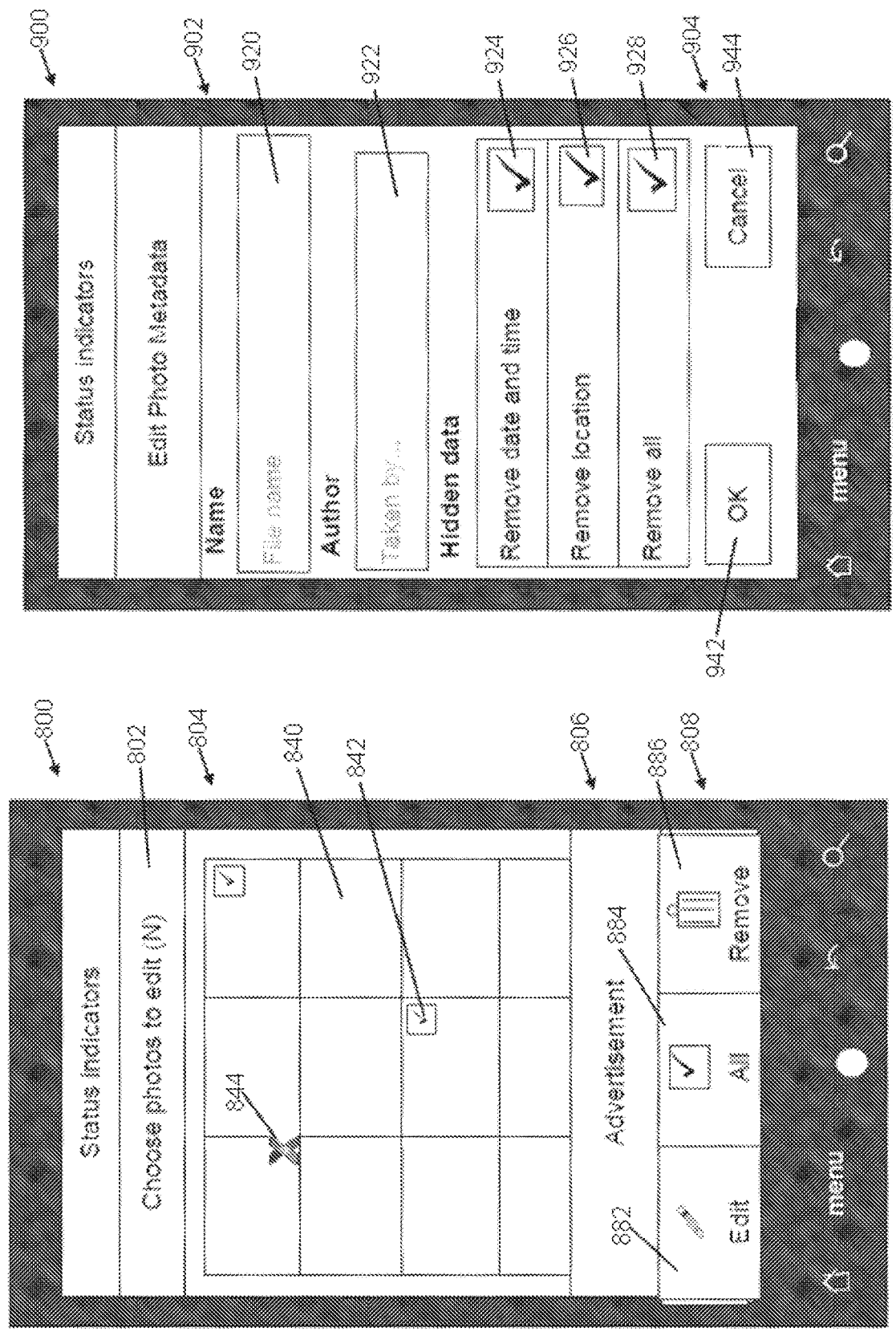

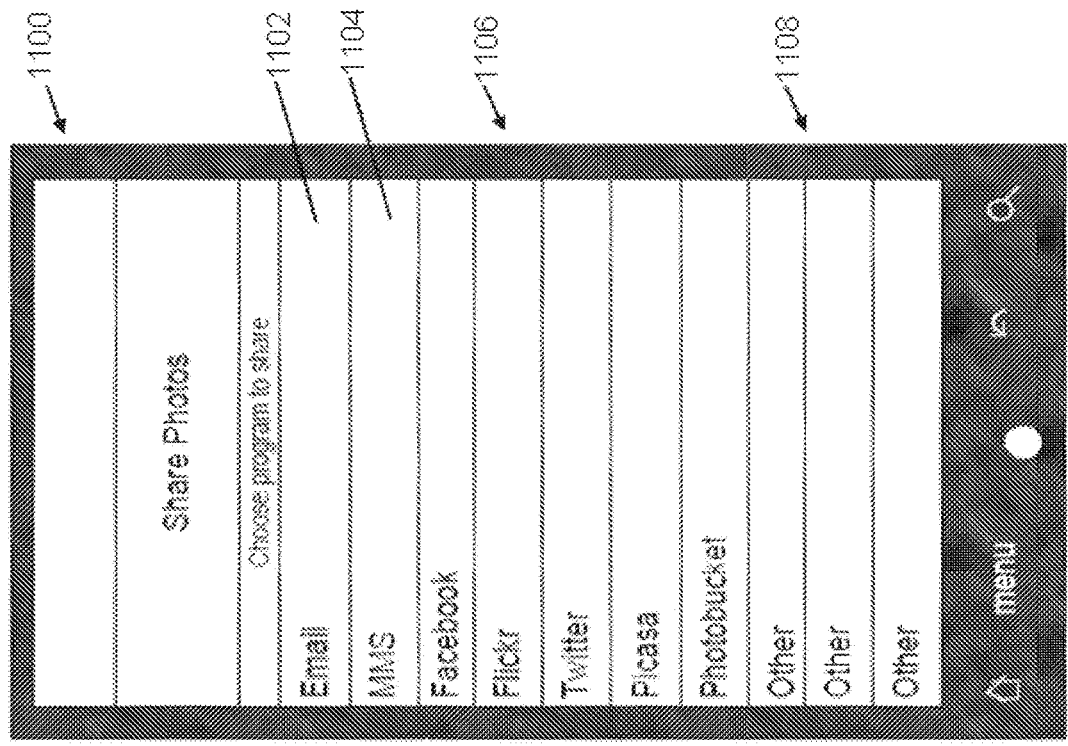
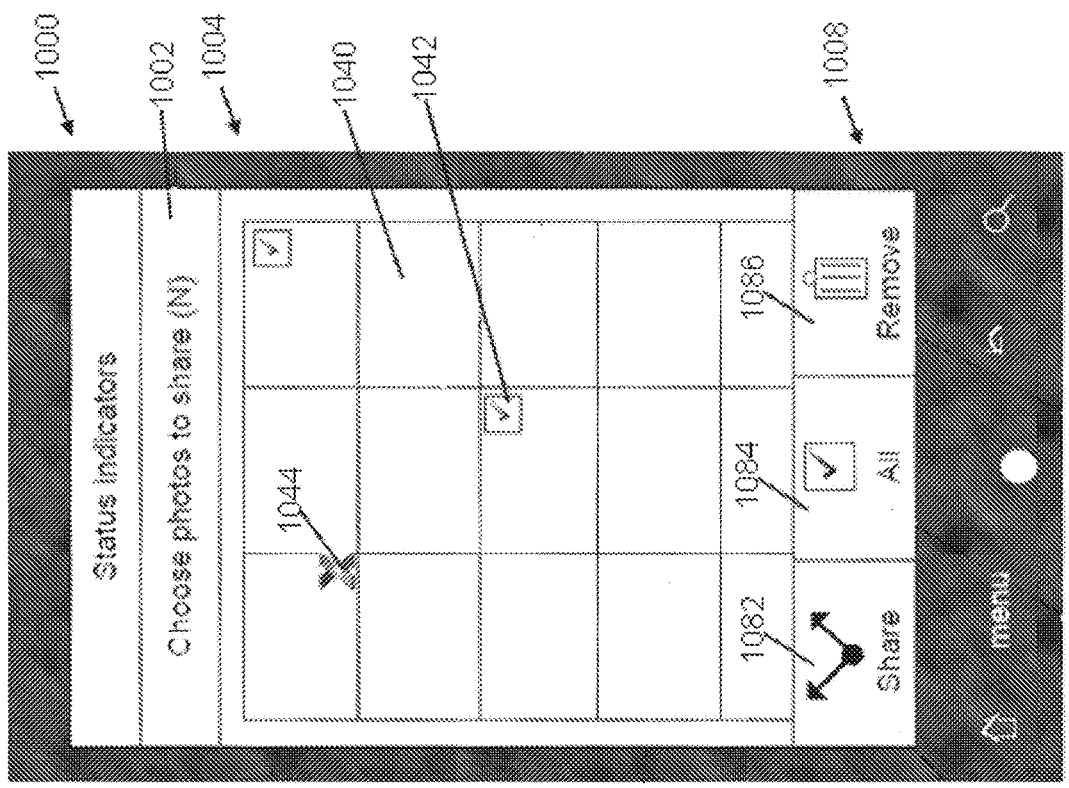
Figure 11
Figure 10

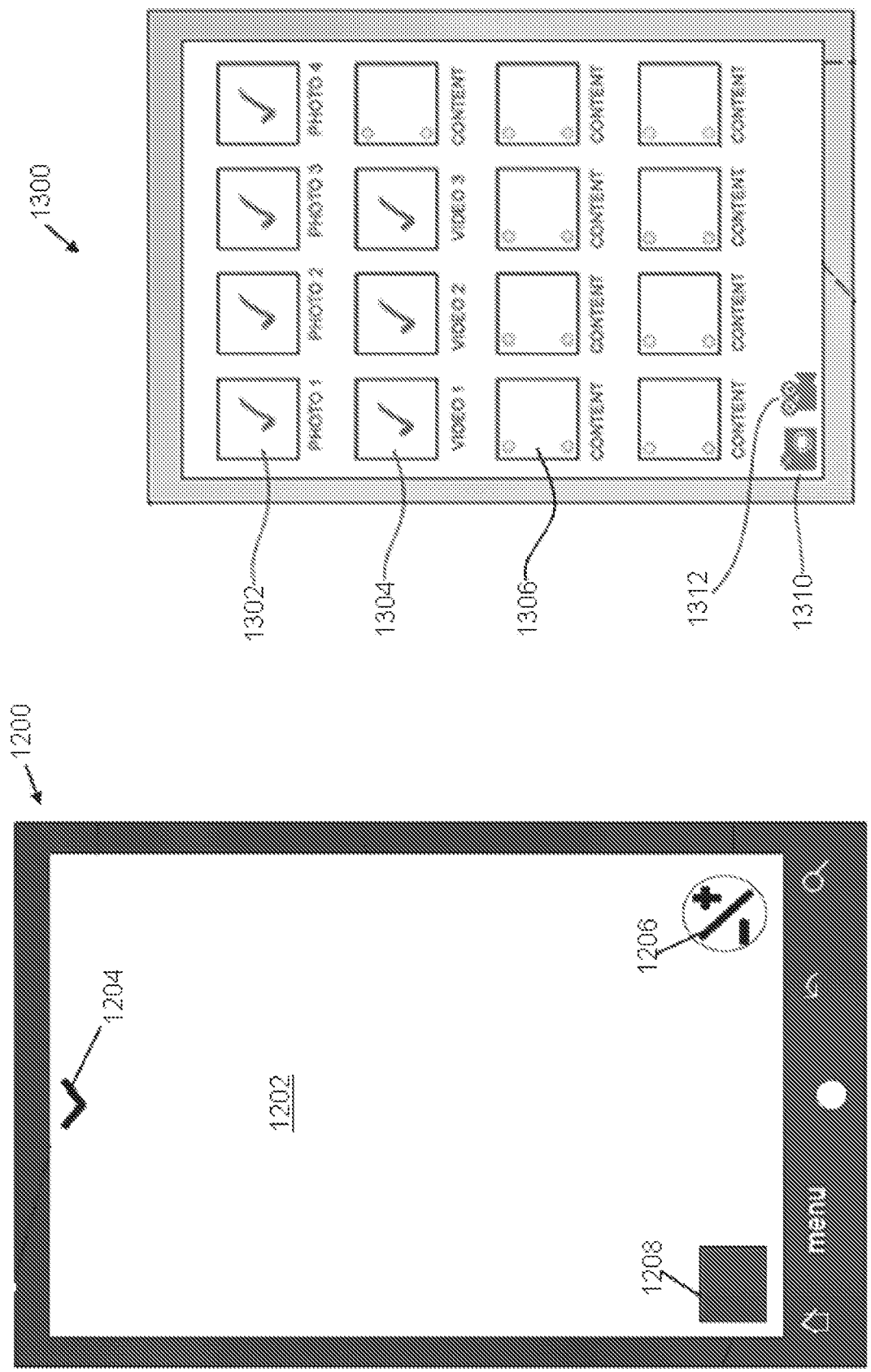

SMART PHONE FOR CONTROLLING METADATA ASSOCIATED WITH EXPORTED IMAGE DATA AND METHODS FOR USE THEREWITH

CROSS-REFERENCE TO RELATED APPLICATIONS

This application is a continuation application of U.S. Utility application Ser. No. 18/242,111, filed on Sep. 5, 2023, entitled "System and Method for Controlling and Organizing Metadata Associated with On-Line Content," which is a continuation application of U.S. patent application Ser. No. 17/582,541, filed on Jan. 24, 2022 and issued as U.S. Pat. No. 11,748,432, entitled "System and Method for Controlling and Organizing Metadata Associated with On-Line Content," which is a continuation application of U.S. patent application Ser. No. 16/545,523, filed on Aug. 20, 2019 and issued as U.S. Pat. No. 11,232,165, entitled "System and Method for Controlling and Organizing Metadata Associated with On-Line Content," which is a continuation application of U.S. patent application Ser. No. 15/640,778, filed on Jul. 3, 2017 and issued as U.S. Pat. No. 10,387,518, entitled "System and Method for Controlling and Organizing Metadata Associated with On-Line Content," which is a continuation application of U.S. patent application Ser. No. 15/082,842, filed on Mar. 28, 2016 and issued as U.S. Pat. No. 9,697,293, entitled "System and Method for Controlling and Organizing Metadata Associated with On-Line Content," which is a continuation application of U.S. patent application Ser. No. 14/500,229, filed on Sep. 29, 2014 and issued as U.S. Pat. No. 9,298,943, entitled "System and Method for Controlling and Organizing Metadata Associated with On-Line Content," which is a continuation application of U.S. patent application Ser. No. 13/481,188, filed on May 25, 2012 and issued as U.S. Pat. No. 8,849,819, entitled "System and Method for Controlling and Organizing Metadata Associated with On-Line Content," which claims the benefit of U.S. Provisional Application Ser. No. 61/515,613, filed on Aug. 5, 2011, entitled "System and Method for Controlling and Organizing Metadata Associated with On-Line Content," the disclosures of which are all incorporated herein by reference.

BACKGROUND AND SUMMARY

Smart phones are required to support global positioning system (GPS) capability by September of 2012. Other mobile devices and televisions are required to support GPS capability by 2018. Many mobile devices, for example mobile phones, associate metadata with content generated or captured by the mobile device, for example photos. For a photo taken by a mobile device, this metadata can include GPS data showing the location where the photo was taken, a date showing when the photo was taken, the name of the owner of the mobile device, and other data such as comments or the names of the people in the photo. Typically this associated metadata stays with the photo and can be retrieved by recipients/viewers of the photo, including unintended recipients/viewers of the photo. Users have limited control of this metadata, especially after the content is sent to other users or shared through social networking, photo sharing or other Internet sites.

Privacy issues due to metadata associated with on-line content is a growing concern. Electronic device makers and service providers, and many Internet sites provide varying capabilities to users to control metadata. Many electronic devices record and save metadata associated with content generated or stored on the device. Some device makers and service providers allow a user to view all or part of this stored metadata, while others do not even allow the user to view the associated metadata. Some device makers and service providers allow limited editing of this stored metadata, for example associating a name or other comment with content on the device. Social networking and photo sharing sites have different rules regarding metadata associated with uploaded or generated content. These sites maintain the metadata associated with content, some of these sites allow users to show metadata associated with content, and some allow users to edit some of the metadata associated with content.

The present system and method can be used to manage, control and organize metadata associated with content on various types of electronic devices. These electronic devices can include but are not limited to mobile devices, smart phones, digital cameras, computers, and consumer electronic devices. The system can be part of the device operating system software, a stand-alone application, or part of an integrated component embedded in a GPS-capable device, a camera, a baseband or a system-on-chip (SoC). The system can be used with various types of content including but not limited to digital images and digital videos. Many devices do not allow users to control personal information which is recorded as metadata and stored in content. GPS data, also known as geolocation data or a geotag, dates and name tags are examples of this metadata. Current image capture devices, like mobile phones and digital cameras allow users to turn off geotagging/GPS for their cameras but this method is not ideal for users who want to keep this metadata in their original photos but not include it when sharing their photos on the internet, text or email. The present system enables users to have control over this metadata which is recorded and associated with digital content, so they can remove personal information before sharing them on social networks, email, text and the internet, but let them keep this metadata in their personal copies of the content.

A method is disclosed for controlling metadata associated with content on an electronic device. The method includes displaying interface screens on a display of the electronic device for user entry of instructions regarding metadata control, accepting user instructions regarding metadata control through an input mechanism, modifying metadata of applicable content in accordance with the user instructions, and associating the modified metadata with the applicable content. Associating the modified metadata with the applicable content can include making an electronic copy of original content, associating the modified metadata with the electronic copy, the electronic copy being the applicable content, and not modifying the metadata associated with the original content. Accepting user instructions regarding metadata control can include accepting a profile describing modifications to be made to the metadata. Modifying the metadata of applicable content can include automatically making the modifications described in the profile before exporting the applicable content along with the modified metadata.

The method can also include exporting the applicable content along with the modified metadata from the electronic device. Exporting the applicable content can include electronically mailing the applicable content over a network, uploading the applicable content to a website over a network, or sharing the applicable content with a third party.

The method can also include storing the applicable content along with the modified metadata in memory on the electronic device, and marking the applicable content to indicate that the associated metadata has been modified. Marking the applicable content can include adding a watermark to the applicable content.

The method can include exporting the applicable content along with the modified metadata from the electronic device; and accepting user instructions regarding metadata control can include accepting a plurality of profiles describing modifications to be made to the metadata; and modifying the metadata of applicable content can include determining any relevant profiles of the plurality of profiles, and automatically making the modifications described in the relevant profiles before exporting the applicable content along with the modified metadata. Determining any relevant profiles can include determining a user-selected mechanism for exporting the applicable content, or determining a user-selected destination for exporting the applicable content, or determining a type of content for the applicable content. Modifying the metadata of applicable content can include, when no relevant profiles are found, notifying the user that no relevant profiles were found, and enabling the user to manually modify the metadata of the applicable content before exporting the applicable content.

The method can also include displaying a plurality of content items on the display of the electronic device, and enabling user selection of the applicable content by selecting one or more content items of the plurality of content items. Displaying a plurality of content items can include displaying a watermark to indicate modified content items of the plurality of content items, the metadata associated with the modified content items having already been modified by the system. The plurality of content items can include photos and/or videos stored on the electronic device. Displaying a plurality of content items can include displaying a metadata indicator for each content item that indicates whether that content item has associated metadata information, and/or displaying a geolocation indicator for each content item that indicates whether that content item has associated geolocation metadata information. The method can also include displaying metadata information associated with the applicable content on the display of the electronic device. The method can also include enabling user modification of the displayed metadata information associated with the applicable content, and associating the modified metadata information with the applicable content. The user interface screens can display a map with a pin indicating a desired location, and modifying the metadata of applicable content can include modifying the location information in the metadata of the applicable content to be the desired location.

The interface screens can include an include author selection and an author entry field, and modifying the metadata of applicable content can include: deleting author information from the metadata of the applicable content when the include author selection is not selected, overwriting the author information in the metadata of the applicable content with the entry from the author entry field when the include author selection is selected and the author entry field has an entry, and not modifying the author information in the metadata of the applicable content when the include author selection is selected and the author entry field has no entry. The interface screens can include a watermark selection, and modifying the metadata of applicable content can include adding a watermark to the applicable content when associating the modified metadata with the applicable content. The interface screens can include a filename field; and modifying the metadata of applicable content can include changing the filename in the metadata of the applicable content to include the entry in the filename field when the filename field has an entry, and not modifying the filename in the metadata of the applicable content when the filename field has no entry. The interface screens can include a remove date/time selection; and modifying the metadata of applicable content can include removing the date/time information from the metadata of the applicable content when the remove date/time selection is selected, and not modifying the date/time information in the metadata of the applicable content when the remove date/time selection is not selected. The interface screens can include a remove location selection; and modifying the metadata of applicable content can include removing the location information from the metadata of the applicable content when the remove location selection is selected, and not modifying the location information in the metadata of the applicable content when the remove location selection is not selected. The interface screens can include a remove all selection; and modifying the metadata of applicable content can include removing all of the identifying information from the metadata of the applicable content when the remove all selection is selected, and not removing all of the identifying information from the metadata of the applicable content when the remove all location selection is not selected.

A system is disclosed for controlling metadata associated with content on an electronic device. The system includes a user interface with screens for display on the electronic device for entry of instructions regarding metadata control; an input mechanism accepting the instructions through the user interface; a metadata modification component modifying metadata associated with applicable content in accordance with the instructions; and a metadata association component associating the modified metadata with the applicable content. The metadata association component can make an electronic copy of original content, associate the modified metadata with the electronic copy, and not modify the metadata associated with the original content, the electronic copy being the applicable content. The system can also include a sharing component that prepares the applicable content along with the modified metadata for export from the electronic device. The sharing component can prepare the applicable content and the modified metadata for electronic mailing over a network, for uploading to a website over a network, or for electronic sharing with a third party. The system can also include a memory that stores the applicable content along with the modified metadata, and a marking component that marks the applicable content to indicate that the associated metadata has been modified. The marking component can add a watermark to the applicable content.

The user interface can include screens for entry of a profile including instructions regarding metadata control, and the input mechanism can accept the profile. The system can also include a sharing component that prepares the applicable content along with the modified metadata for export from the electronic device, and the metadata modification component can automatically make the modifications described in the profile before providing the applicable content and the modified metadata to the sharing component.

The system can include a sharing component that prepares the applicable content along with the modified metadata for export from the electronic device, and the input mechanism can accept a plurality of profiles describing modifications to be made to the metadata, and the metadata modification component can determine any relevant profiles of the plurality of profiles, and automatically make the modifications described in the relevant profiles of the plurality of profiles before providing the applicable content and the modified metadata to the sharing component. The metadata modification component can determine relevant profiles based on a user-selected mechanism for exporting the applicable content, or a user-selected destination for exporting the applicable content, or a type of content for the applicable content. When no relevant profiles are found the metadata modification component can notify the user that no relevant profiles were found, and enables the user to manually modify the metadata of the applicable content before providing the applicable content to the sharing component.

The system can include a display component that displays a plurality of content items on the screen of the electronic device, and the input mechanism can accept user selection of the applicable content by selecting one or more content items of the plurality of content items. The system can also include a marking component that marks content to indicate that the associated metadata has been modified, and the display component can display a watermark to indicate modified content items of the plurality of content items, the metadata associated with the modified content items having already been modified by the system. The content items can include photos and/or videos stored on the electronic device. The display component can display a metadata indicator for each content item that indicates whether that content item has associated metadata information. The display component can display a geolocation indicator for each content item that indicates whether that content item has associated metadata information that includes geolocation information. The system can also include a metadata display component that displays metadata information associated with the applicable content on the display of the electronic device. The metadata modification component can enable user editing of displayed metadata information associated with the applicable content, and associate the edited metadata information with the applicable content. The user interface can include a map with a pin indicating a desired location, and the metadata modification component can modify the metadata location information of the applicable content to be the desired location.

The user interface can include an include author selection and an author entry field; and the metadata modification component can delete the author information from the metadata of the applicable content when the include author selection is not selected, overwrite the author information in the metadata of the applicable content with the entry from the author entry field when the include author selection is selected and the author entry field has an entry, and not modify the author information in the metadata of the applicable content when the include author selection is selected and the author entry field has no entry. The system can include a marking component for marking content to indicate that the associated metadata has been modified, and the user interface can include a watermark selection field, where the marking component adds a watermark to the applicable content when the watermark selection field is selected and the metadata of the applicable content is modified, and does not add a watermark to the applicable content when the watermark selection field is not selected. The user interface can include a filename field; and the metadata modification component can change the filename in the metadata of the applicable content to include the entry in the filename field when the filename field has an entry, and not change the filename in the metadata of the applicable content when the filename field has no entry. The user interface can include a remove date/time selection; and the metadata modification component can remove the date/time information from the metadata of the applicable content when the remove date/time selection is selected, and not modify the date/time information in the metadata of the applicable content when the remove date/time selection is not selected. The user interface can include a remove location selection; and the metadata modification component can remove the location information from the metadata of the applicable content when the remove location selection is selected, and not modify the location information in the metadata of the applicable content when the remove location selection is not selected. The user interface can include a remove all selection; and the metadata modification component can remove all of the identifying information from the metadata of the applicable content when the remove all selection is selected, and not remove all of the identifying information from the metadata of the applicable content when the remove all selection is not selected.

BRIEF DESCRIPTION OF THE DRAWINGS

The above-mentioned aspects of the present invention and the manner of obtaining them will become more apparent and the invention itself will be better understood by reference to the following description of exemplary embodiments of the invention taken in conjunction with the accompanying drawings, wherein:

FIG. 1 illustrates an exemplary initial entry screen for the system before the user has loaded any content into the system;

FIG. 2 illustrates an exemplary active system entry interface for the system after the user has loaded content into the system;

FIG. 5 illustrates an exemplary view photo interface where a photo can be viewed and a function can be selected for processing the viewed photo;

FIG. 6 illustrates an exemplary settings interface for setting parameters of the system;

FIG. 7 illustrates an exemplary metadata listing;

FIG. 8 illustrates an exemplary modify photo interface where photos can be selected for metadata modification by the system;

FIG. 9 illustrates an exemplary photo metadata editing interface;

FIG. 10 illustrates an exemplary photo sharing interface where the user can select photos for sharing;

FIG. 11 illustrates an exemplary sharing selection interface where the user can select the methods for photo sharing;

FIG. 12 illustrates an exemplary camera interface for taking photos;

FIG. 13 illustrates another exemplary content selection screen with options for recording new image and video content;

DETAILED DESCRIPTION

Figure 4:
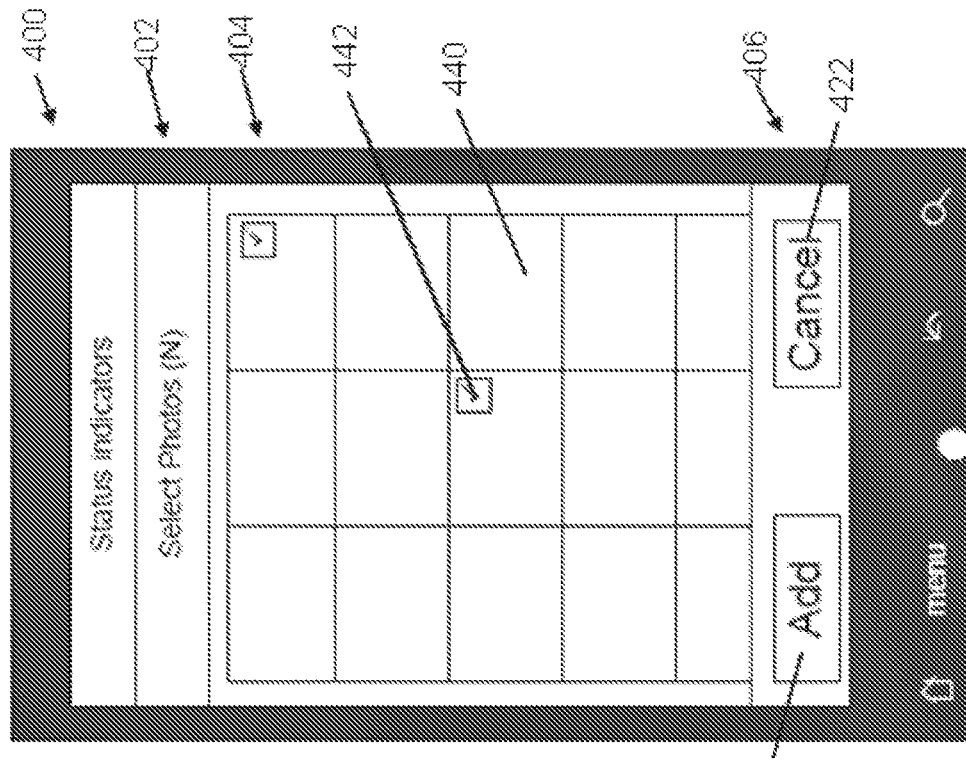
FIG. 4 illustrates an exemplary select photos interface where the user can select photos to add to a photo album.

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

The present system can be used to manage, control and/or organize metadata associated with content on various types of electronic devices. These electronic devices can include but are not limited to mobile devices, smart phones, digital cameras, computers (including pad, laptop and desktop computers running various operating systems), and consumer electronic devices. The system can be embedded as part of the device operating system, a stand-alone application, or in an integrated circuit (IC) chip that is part of a GPS-capable device, a camera, a baseband or a system-on-chip (SoC). The system can be used with various types of content including but not limited to digital images and digital video in compressed or uncompressed formats.

Many devices do not allow users to control personal information which is recorded as metadata and stored in content, for example photos. GPS data, also known as geolocation data or a geotag, dates and name tags are examples of this metadata. Current image capture devices, like mobile phones and digital cameras allow users to turn off geotagging/GPS for their cameras but this method is not ideal for users who want to keep this metadata in their original photos but not include it when sharing their photos on the internet, text or email. The present system enables users to have control over this metadata which is recorded and associated with digital content, so they can remove or modify personal information before sharing the content on social networks, email, text and the internet, but let them keep this metadata in their personal copies of the content. The system can provide the capability to perform some or all of the following functions on various types of electronic devices. The system can enable metadata removal, editing and viewing with the purpose of sharing or exporting content with which the metadata is associated, for example through social networks, email, text, biogs, photo websites and etail (eBay, Craigslist, etc.). The system can enable watermarking via an overlay on the content, or a mark on a bottom corner or other location of the content, for example a photo. The watermark can signify that the metadata associated with the content has been removed/edited. The system can save content to a designated folder or overwrite the original content for export to other applications. The system can be set to remove all metadata on sharing of content which will allow users to automatically remove metadata when sharing content on-line, for example photos/videos. The system can be an embedded feature for a smartphone OS (for example, Apple iOS, Google Android, Microsoft Win7, Java, Blackberry, Symbian, etc.). The system can be an embedded application in chip components (ICs) for integrating into consumer electronics devices as embedded controls (for example, digital cameras, hard drives, connected consumer electronics devices, smart TVs, etc.)

Exemplary embodiments of the system implementing some of the above functionality are described below. These embodiments are directed to a smart phone implementation, but can also be implemented on computers or other electronic devices. The content discussed with these embodiments is generally photos, but other types of content having associated metadata can be managed by the system. Exemplary user interface screens for these exemplary embodiments are shown and the associated functionality is described. The system can be used by various types of users including mothers with children, photographers, people that use singles sites and social networking sites, and people that use or provide content to social networking, news (eye on), or blogger sites, etc. The system can be used for photos, videos and other content that is captured or stored by the electronic device, or content received from other devices or persons and forwarded. The system can be used to view, edit and/or add metadata. The system can also be used to prepare content by removing or editing metadata before exporting, emailing or uploading to another user, or to a website.

The system can overwrite original content or create a folder for edited content, content with the metadata removed or edited as desired by the user. The system can include free-versions and paid-versions. A free-version can enable a limited number of photos to be processed, and then periodically ask the user, through pop-up windows or other methods, to upgrade based on a timer or the number of photos processed by the system. The free version can disable some of the user-controlled features, for example content watermarking. A paid version can unlock more or all features and allow the user to have more control over the system settings. The system can store anonymous usage data in a server database. This usage data can include number of application downloads, number of application starts, amount of time the application is open, number of application failures, number of photos added, number of photos processed, amount of hidden data removed, amount of GPS data removed, number of thumbnails removed, number of dates removed, number of titles changed, number of times taken by data is changed, number of photos shared through email, number of photos shared through various social networking and photo sharing sites (for example, Facebook, Flickr, Twitter, Picasa, Photobucket, WordPress etc.), or other data of interest. This usage data can be sent to a metrics database created on a system server when an internet connection is detected, and otherwise stored locally until an internet connection is detected. Data reporting frequency can be set to a certain time period or usage amount or other parameter and can be changed through the system server or otherwise.

FIG. 1 shows an exemplary initial entry screen 100 for the system before the user has loaded any content into the system. The initial entry screen 100 includes a system logo, an information icon 102, a take picture button 104, and an add photo button 106. The information icon 102 can bring up an information screen providing information about the system, including for example, a short description of the system, a system version identifier, a link to a website regarding the system, and some usage information for the user device, for example, number of photos modified, number of photos shared, etc. The free version of the information screen can also include advertisement space on the information screen. The take picture link 104 can bring up a camera interface 1200 to take pictures to be managed by the system. The add photo link 106 can bring up an add photos interface 300 to add photos to be managed by the system.

FIG. 2 shows an exemplary active system entry interface 200 for the system after the user has loaded content into the system. The active entry screen 200 includes a parameter bar 202, a content section 204, an advertisement section 206 and a command bar 208. The parameter bar 202 includes one or more parameters of potential interest to the user, for example the number of photos currently managed by the system. The content section 204 includes photos or other content currently managed by the system. The advertisement section 206 can be eliminated on a paid version of the system, which provides more screen space for the content section 204 and/or the command bar 208. The command bar 208 includes icons for one or more commands that can be selected by the user.

In this embodiment, the content section 204 shows an array of cells 240 where each cell 240 contains a thumbnail of a photo or other content managed by the system. The content can be organized and displayed in various other arrangements as would be obvious to those of skill in the art. A check box 242 in a cell 240 indicates that the user has selected the content in that cell 240. A system icon 244 in a cell 240 indicates that the content in that cell 240 has already been modified by the system. The system icon 244 can indicate content that has been modified in the current session, or can indicate content that has been modified by the system whether in the current or prior sessions.

In this embodiment, the command bar 208 provides a modify content icon 282, a share content icon 284, a launch camera icon 286, an add content icon 288 and a trash or delete content icon 290. The modify content icon 282 can bring up a modify content interface 800 to modify the content selected in the content section 204 as indicated by the check box 242 in the cell 240. The share content icon 284 can bring up a content sharing interface 1100 to share the content selected in the content section 204 as indicated by the check box 242 in the cell 240. The launch camera icon 286 can bring up a camera interface 1200 to take pictures to be managed by the system. The add content icon 288 can bring up an add content interface 300 to add content to be managed by the system. The delete content icon 290 can delete the content selected in the content section 204 as indicated by the check box 242 in the cell 240 so that that content is no longer managed by the system. The delete content icon 290 only affects the copies of the selected content being managed by the system, but does not affect the original or other copies of the content that may be stored elsewhere by the user. A confirm window can be brought up when the delete content icon 290 is selected asking for the user to select "yes" or "no" before actually deleting the copies of the selected content being managed by the system.

The exemplary screens 100, 200 also include device status indicators and controls that are commonly found on a smart phone. These device status indicators and controls may differ based on smart phone manufacturer, operating system, service provider or other factors. Equivalent device status indicators and controls can be implemented in computers and other consumer electronic devices using tool bars, drop down menus, and other interface means know to those of skill in the art. The screens 100, 200 include a status indicators bar 210, and device controls that include a home icon 212, a menu icon 214, a back icon 216 and a search icon 218. The status indicators bar 210 can include status information for the device, for example active applications, signal level, etc. In general the device controls have the following functions, though they can be programmed to perform different functions depending on the conditions. The home icon 212 can take the user out of the system application and to a home screen for the device. The menu icon 214 can bring up an overlay window with commands relevant to the current screen of the system application, for example a settings icon to go to a settings interface (see FIG. 5) and an information icon to bring up information about the system. The back icon 216 can take the user back to the prior screen without executing any further actions on the current screen. The search icon 218 can bring up a search interface relevant to the current application.

Figure 3:
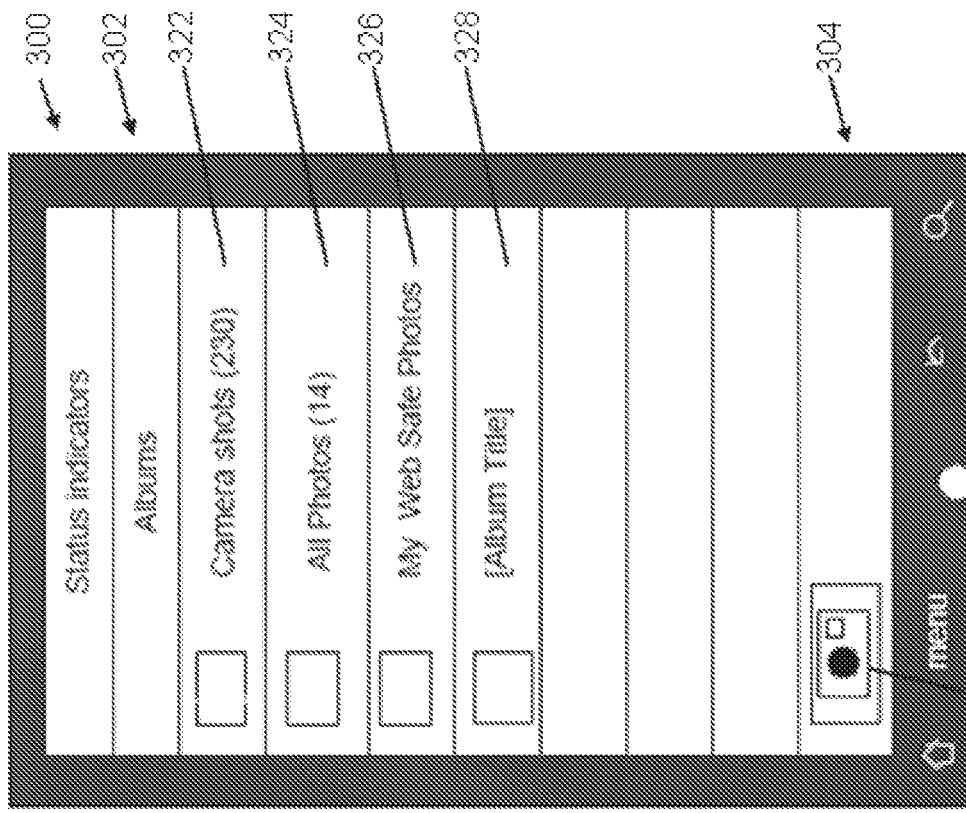
FIG. 3 illustrates an exemplary add photos interface where the user can add/import photos to the system.

FIG. 3 shows an exemplary add content interface 300 that can be reached by selecting the add photos link 106 on the initial entry screen 100 or the add content icon 288 on the active entry screen 200. When the add content interface 300 is displayed, the back icon 216 can be selected to go back to the initial entry screen 100 or the active entry screen 200 depending upon which was the prior screen. The add content interface 300 includes a content folders or photo albums section 302 and a command bar 304. In a free version of the system, the add content interface 300 can also include an advertisement section. The photo albums section 302 includes one or more default and user-defined photo albums. In this instance, the photo albums section 302 includes a Camera Shots album link 322 with 230 photos, an All Photos album link 324 with 14 photos and a My Web Safe Photos album link 326. The photo albums section 302 also includes an album creation link 328. By selecting the album creation link 328, the user can enter a title for the new album and then control is passed to a select photos interface 400 where the user can add photos to the new album. The command bar 304 includes a launch camera icon 330 that can bring up a camera interface 1200 to take pictures to be managed by the system.

FIG. 4 shows an exemplary select photos or select content interface 400 that can be reached by selecting one of the photo albums in the photo albums section 302 of the content interface 300. When the photos interface 400 is displayed, the back icon 216 can be selected to go back to the add content interface 300. The select photos interface 400 includes a parameter bar 402, a photo section 404, and a command bar 406. In a free version of the system, the select photos interface 400 can also include an advertisement section. The parameter bar 402 includes one or more parameters of potential interest to the user, for example the number of photos currently selected by the user. The photo section 404 includes photos that are managed by the system. The command bar 406 includes icons for one or more commands that can be selected by the user.

In this embodiment, the photo section 404 shows an array of cells 440 where each cell 440 contains a thumbnail of a photo managed by the system. The photos can be organized and displayed in various other arrangements as would be obvious to those of skill in the art. A check box 442 in a cell 440 indicates that the user has selected the photo in that cell 440. The number of photos selected in the parameter bar 402 can be increased or decreased as the user selects or deselects cells 440 in the photo section 404. An unselected cell 440 can be selected by clicking-on the unselected cell 440 with a pointing device or tapping on the unselected cell 440 with a touch screen. A selected cell 440 can be deselected by clicking-on the selected cell 440 with a pointing device or tapping on the selected cell 440 with a touch screen.

The command bar 406 of the select photos interface 400 includes an add button 420 and a cancel button 422. When the add button 420 is selected, the photos selected by the user in the photo section 404 can be added to the photo album previously selected in the photo albums section 302 of the add content interface 300. When the cancel button 422 is selected, all of the photos in the photo section 404 can be deselected and the user can start over selecting photos to add to the photo album previously selected in the photo albums section 302 of the add photos interface 300. Alternatively, when the cancel button 422 is selected, the system can exit the select photos interface 400 without adding selected photos to a photo album and return to the add content interface 300.

FIG. 5 shows an exemplary view photo or view content interface 500 that can be reached by double tapping a photo in the select photos interface 400. The view photo interface 500 includes a filename 502 for the photo being displayed and a photo viewer section 504 where the photo is displayed. The photo viewer section 504 can include photo viewing functionality, such as zoom and pan. With a touch screen, the next or previous photo in a photo album or photo file can be displayed by touching the photo viewer section 504 of the screen and swiping left for next photo or right for previous photo. In alternative embodiments, arrows or directional indicators can be placed on the right and left side of the photo viewer section 504 and the next or previous photo in a photo album or file can be displayed by selecting the appropriate directional indicator. Alternative methods of looking at the next or previous photos or other content will also be known to those of skill in the art.

By selecting the menu icon 214, a menu of commands 510 can be overlaid on the view photo interface 500. In this embodiment, the menu of commands 510 includes a modify photo icon 512, a share photo icon 514, a photo details icon 524, a settings icon 518, a delete photo icon 520 and an info icon 522. The modify photo icon 512 can bring up a modify photo interface 800 to modify the photo displayed in the photo viewer 504. The share photo icon 514 can bring up a photo sharing interface 1100 to share the photo displayed in the photo viewer 504. The details icon 516 can display the metadata associated with the photo displayed in the photo viewer 504. An exemplary listing of metadata is shown in FIG. 7. The settings icon 518 can bring up a settings interface 600 for the system. The delete photo icon 520 can delete the photo displayed in the photo viewer 504. The info icon 522 can bring up an information screen providing information about the system, including for example, a short description of the system, a system version identifier, a link to a website regarding the system, and some usage information for the user device, for example, number of photos modified, number of photos shared, etc.

FIG. 6 shows an exemplary settings interface 600 that can be reached by selecting the settings icon 518 of the view photo interface 500, or the settings icon displayed when the menu control 214 is selected on many other screens of the system. The settings interface 600 includes an Include Author checkbox 602, a Taken By field 604, a Watermark checkbox 606 and a manage accounts section 608. When the Include Author checkbox 602 is checked and an entry is made in the Taken By field 604, then the entry in the Taken By field 604 can overwrite the author/artist metadata associated with the content when it is modified by the system. When the Include Author checkbox 602 is checked and no entry is made in the Taken By field 604, then the author/artist metadata associated with the content can be left unmodified by the system. When the Include Author checkbox 602 is not checked, then the author/artist metadata associated with a photo can be removed from the metadata when it is modified by the system. If the Watermark checkbox 606 is checked, then a system watermark is included on a photo modified by the system to show that the photo has been modified by the system. If the Watermark checkbox 606 is not checked, then no system watermark is included on a photo modified by the system. In a free version of the system, the settings interface 600 can be modified to not display the Watermark checkbox 606 and to put a system watermark on all photos modified by the free version of the system.

The manage accounts section 608 of the settings interface 600 can include a listing of social network and photo sharing websites. This listing of social network and photo sharing websites can be those selected by the user or a default list with functionality to add or remove sites. When a particular site from the manage accounts section 608 is selected, a social networking/photo sharing interface for that particular site can be displayed. The social networking/photo sharing interface can include an application programming interface for the selected site and a back button (for example the device control 216) to return to the settings interface 600.

FIG. 7 shows an exemplary metadata listing that can be displayed by selecting the details icon 524 from the menu of commands on the view photo interface 500. The metadata listing can include information about a device that took the photo or created the content, the filename of the content, the name of the device that created the content, the date and time the content was created, the GPS data of the location where the content was created, image or file parameters for the content, and additional information associated with the content, or with the device, or with the user creating the content or using the device.

FIG. 8 shows an exemplary modify photo interface 800 that can be reached by selecting a modify photo icon including the modify photo icon 282 of the active system interface 200 or the modify photo icon 512 of the menu of commands 510 of the view photo interface 500. Selecting the back device control 216 can return the user from the modify photo interface 800 to the previous screen without executing further commands in the modify photo interface 800. The modify photo interface 800 includes a parameter bar 802, a photo section 804, an advertisement section 806 and a command bar 808. The parameter bar 802 includes one or more parameters of potential interest to the user, for example the number of photos currently selected for modification by the user. The photo section 804 includes photos that are currently managed by the system. The advertisement section 806 can be eliminated on a paid version of the system, which provides more screen space for the photo section 804 and/or the command bar 808. The command bar 808 includes icons for one or more commands that can be selected by the user.

In this embodiment, the photo section 804 shows an array of cells 840 where each cell 840 contains a thumbnail of a photo managed by the system or photos in the currently selected photo album. The photos can be organized and displayed in various other arrangements as would be obvious to those of skill in the art. A check box 842 in a cell 840 indicates that the user has selected the photo in that cell 840 for modification. A system icon 844 in a cell 840 indicates that the photo in that cell 840 has already been modified by the system. The system icon 844 can indicate photos that have been modified in the current session, or can indicate photos that have been modified by the system whether in the current or prior sessions. In this embodiment, the command bar 808 provides an edit icon 882, an all icon 884 and a delete or remove icon 886.

The user can select individual photos for modification by selecting individual cells 840, indicated by the check boxes 842. Alternatively, the user can select the all icon 884 to select all of the photos in the photo section 804. If all of the photos in the photo section 804 are currently selected, then selecting the all icon 884 can deselect all of the photos in the photo section 804. The edit icon 882 can bring up a photo metadata modification interface 900 to modify the photos that are selected in the photo section 804 as indicated by the check boxes 842 in the cells 840. The remove icon 886 can remove the photos that are selected in the photo section 804 as indicated by the check boxes 842 in the cells 840 so that those photos are no longer subject to modification in this session of the modify photo interface 800. A confirm window can be brought up when the remove photo icon 886 is selected asking for the user to select "yes" or "cancel" before actually removing the selected photos. If the user selects "yes" then the photos can be removed and the user returned to the previous screen, and if the user selects "cancel" then the photos can not be removed and the user returned to the previous screen.

FIG. 9 shows an exemplary photo metadata modification interface 900 that can be reached by selecting the edit icon 882 of the modify photo interface 800. The metadata modification interface 900 includes metadata selection section 902 and a command bar 904. The metadata selection section 902 includes a Filename field 920, an Author field 922, a remove date/time checkbox 924, a remove location checkbox 926 and a remove all checkbox 928. The command bar 904 includes an OK button 942 and a Cancel button 944. No actual changes are made to the metadata for the photos selected on the modify photo interface 800 until the OK button 942 is selected. When the OK button 942 is selected then the metadata for the selected photos is modified as determined by the fields and checkboxes in the metadata selection section 902. A confirmation window can appear indicating that the metadata was successfully modified for the selected photos, and then the user can be returned to the modify photo interface 800 with system icons 844 added to the photos that were modified. When the Cancel button 944 is selected then the metadata for the selected photos is not modified and the user is returned to the modify photo interface 800.

The user can enter a filename in the Filename field 920 to be associated with all of the photos selected in the photo section 804 of the modify photo interface 800. If only one photo is selected then that photo receives the name entered in the Filename field 920. If multiple photos are selected then a numerical suffix can be added to the filenames for each of the photos, for example Vacation_001, Vacation_002, etc. If the Filename field 920 is left blank, then no change is made to the filename in the metadata. The user can enter an author name in the Author field 922 to be associated with all of the photos selected in the photo section 804 of the modify photo interface 800. If on the settings screen 600, the Include Author checkbox 602 is checked and an author name was entered in the Taken By field 604, then that author name can appear in the Author field 922. If the remove date/time checkbox 924 is checked then the date/time fields are blanked out in the metadata for the selected photos, otherwise no change is made to the date/time in the metadata. If the remove location checkbox 926 is checked then the location and GPS fields are blanked out in the metadata for the selected photos, otherwise no change is made to the location and GPS fields in the metadata. If the remove all checkbox 928 is checked then all of the fields are blanked out in the metadata for the selected photos, otherwise no additional fields are changed in the metadata.

FIG. 10 shows an exemplary photo sharing or export interface 1000 that includes a parameter bar 1002, a photo section 1004 and a command bar 1008. A free version of the system can also include an advertisement section. The parameter bar 1002 includes one or more parameters of potential interest to the user, for example the number of photos currently selected for sharing or export. The photo section 1004 includes photos that are currently managed by the system. The command bar 1008 includes icons for one or more commands that can be selected by the user.

In this embodiment, the photo section 1004 shows an array of cells 1040 where each cell 1040 contains a thumbnail of a photo managed by the system or photos in the currently selected photo album. The photos can be organized and displayed in various other arrangements as would be obvious to those of skill in the art. A check box 1042 in a cell 1040 indicates that the user has selected the photo in that cell 1040 for modification. A system icon 1044 in a cell 1040 indicates that the photo in that cell 1040 has already been modified by the system. The system icon 1044 can indicate photos that have been modified in the current session, or can indicate photos that have been modified by the system whether in the current or prior sessions. In this embodiment, the command bar 1008 provides a share icon 1082, an all icon 1084 and a remove icon 1086.

The user can select individual photos for sharing by selecting individual cells 1040, indicated by the check boxes 1042. Alternatively, the user can select the all icon 1084 to select all of the photos in the photo section 1004. If all of the photos in the photo section 1004 are currently selected, then selecting the all icon 1084 can deselect all of the photos in the photo section 1004. The share icon 1082 can bring up a sharing selection interface 1100 to select the methods for sharing the photos selected in the photo section 1004. The remove icon 1086 can remove the photos that are selected in the photo section 1004 as indicated by the check boxes 1042 in the cells 1040 so that those photos are no longer subject to sharing in this session of the photo sharing interface 1000. A confirm window can be brought up when the remove photo icon 1086 is selected asking for the user to select "yes" or "cancel" before actually removing the selected photos. If the user selects "yes" then the photos are removed and the user is returned to the photo sharing interface 1000, and if the user selects "cancel" then the photos are not removed and the user is returned to the photo sharing interface 1000.

FIG. 11 shows an exemplary sharing selection interface 1100 for user selection of methods for sharing selected photos. The sharing selection interface 1100 can be reached in various ways including by selecting the share icon 284 of the active system entry interface 200, selecting the share icon 514 of the command menu 510, or selecting the share icon 1082 of the photo sharing interface 1000. Selecting the back device control 216 can return the user from the sharing selection interface 1100 to the photo sharing interface 1000. The sharing selection interface 1100 includes options for the user to select in sharing selected photos. In this embodiment, the options include electronic mail (Email) option 1102, multimedia messaging service (MMS) option 1104, various social networking and photo sharing website options 1106 (Facebook, Flickr, Twitter, Picasa, Photobucket, etc.) and other options 1108 where the user can enter additional social networking and photo sharing websites. The options listed in the sharing selection interface 1100 can be tailored for a particular device so that unavailable options are not listed. The user can be prompted to select photo file size before sharing, for example small, medium or large.

If the user selects the Email option 1102, then the system can open the appropriate electronic mail client on the device, attach the photos and allow the user to enter the e-mail addresses of the intended recipients. If the user selects the NMS option 1104, then the system can open the appropriate messaging client on the device, attach the photos and allow the user to enter the phone numbers of the intended recipients. When sending photos using the MMS option 1104, the system can automatically reduce the photos to small file size. If the user selects one of the various social networking, photo sharing or other website options 1106, 1108, then the system can open an Internet browser on the device accessing the user's home page on the selected site and upload the selected photos. The system can include user selectable default profiles to be applied to content based on the method selected for exporting/sharing of the content. After exporting/sending/uploading the selected photos using the selected sharing options, the user can be returned to the sharing selection interface 1100. Alternatively, if the device or photo sharing client exits the user from the system, then when the user returns to the system, the system can return to the photo sharing interface 1000 with the same photos selected for sharing.

FIG. 12 shows an exemplary camera interface 1200 for taking photos. The camera interface 1200 can be reached in various ways including by selecting the camera icon 286 of the active system entry interface 200, or selecting the camera icon 330 of the add photos interface 300. The camera interface 1200 includes a photo preview area 1202, a pull-down controls menu 1204, a zoom function 1206 and a system return button 1208. When the camera takes a photo, it can record exchangeable image file format (EXIF) metadata including location (GPS) data and store with the photos by default. The photo preview area 1202 can show what the device sees in the lens before taking a photo. The pull-down controls menu 1204 can pull down controls for the camera, for example exposure, brightness, effects, settings, etc. The zoom function 1206 can zoom in and out on the subject and this can be shown by the change in the photo preview area 1202. The system return button 1208 or the device back control 216 can return the user to the system interface screen where the camera was activated adding the captured photo or photos taken while in the camera interface 1200.

Figure 14:
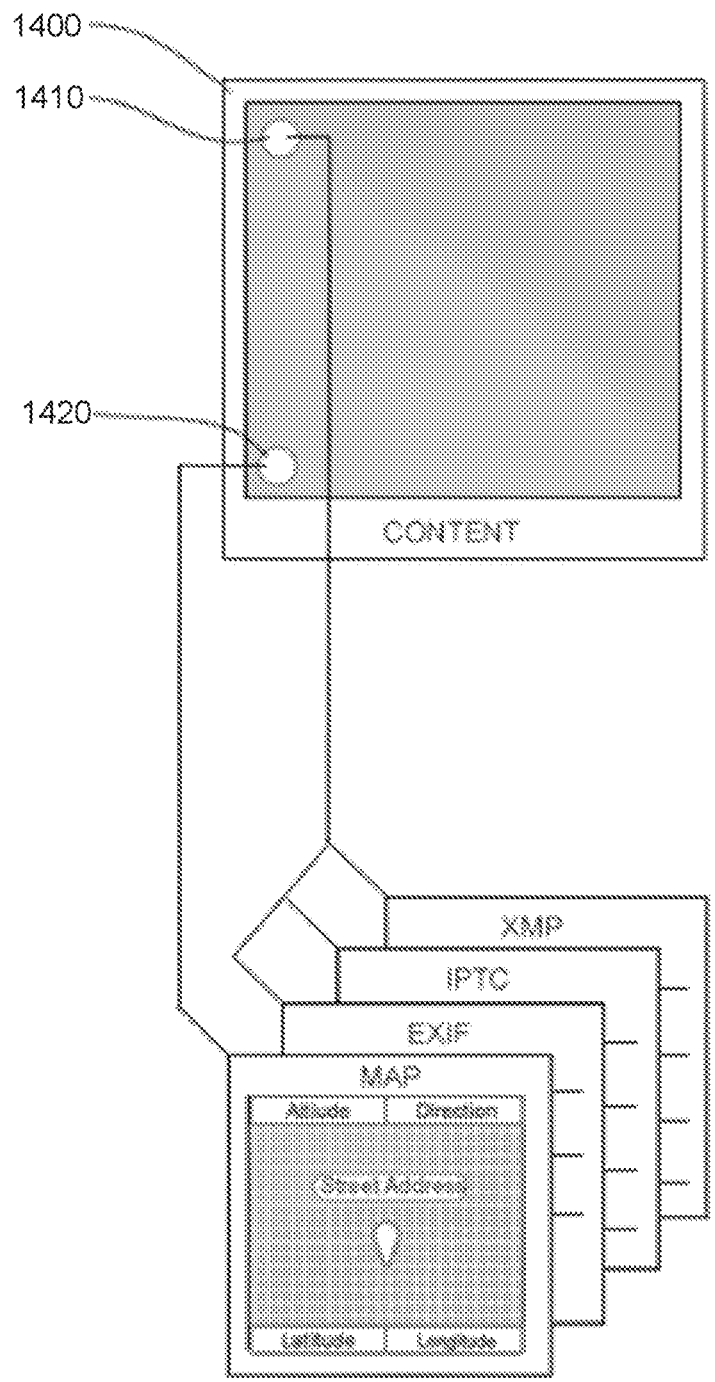
FIG. 14 illustrates an individual content item with selectable overlay indicators showing metadata information associated with the content item.
Figure 15:
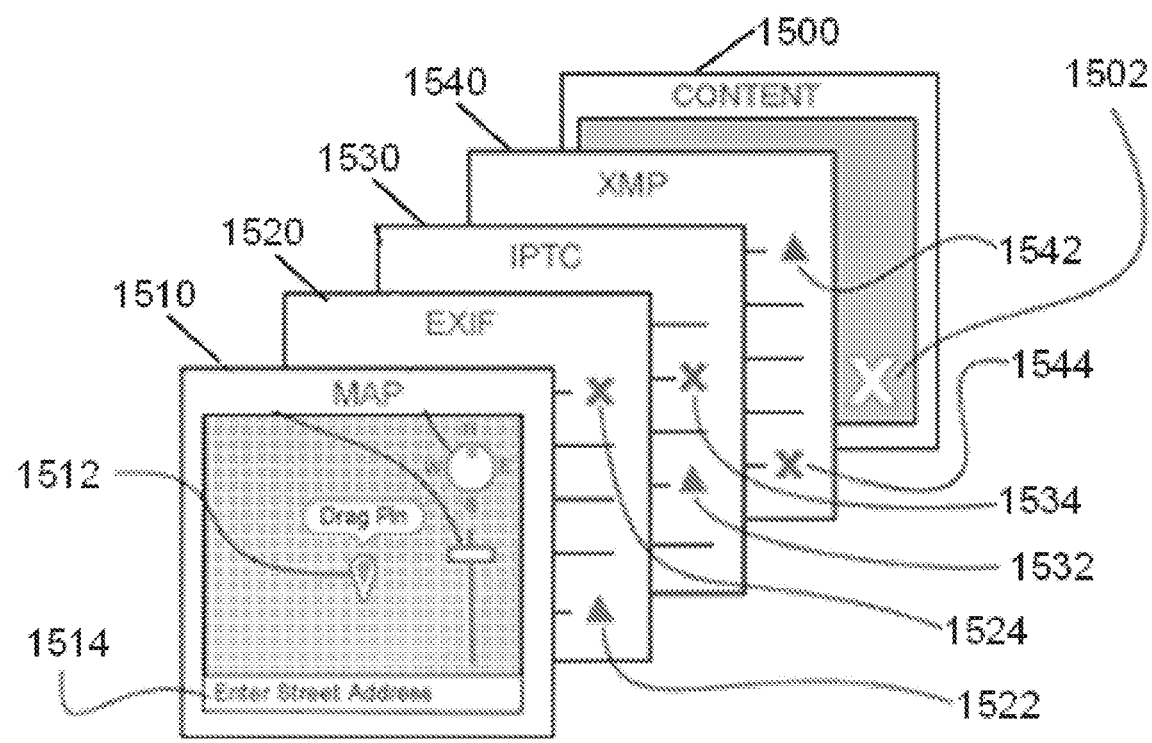
FIG. 15 illustrates an exemplary content item and its associated metadata including geolocation, EXIF, IPTC and XMP format metadata.

FIGS. 13-15 show another exemplary embodiment of a system and method for controlling and organizing metadata that includes many of the features described above. The system can be designed to integrate within the device operating system settings, content viewer, web browser or stand-alone application for automatically or manually editing metadata in content that is to be shared from the device.

FIG. 13 shows a content selection screen 1300 with options for recording new image and video content. The content selection screen 1300 includes an array of one or more types of content items including image content items 1302, video content items 1304 and other types of content items 1306 which can include textual or other types of content. The content items can be selected individually or as a batch. New image content can be created and added to the system by selecting the camera icon 1310 and new video content can be created and added to the system by selecting the video icon 1312.

FIG. 14 shows an individual content item 1400 with selectable overlay indicators 1410, 1420 showing when metadata information is contained or associated with the content item. The first overlay indicator 1410 can indicate whether the content item 1400 includes metadata information. The metadata information can include, for example, Exchangeable Image File Format (EXIF), International Press Telecommunications Council (IPTC) and/or Extensible Metadata Platform (XMP) format metadata information. The second overlay indicator 1420 can indicate whether geolocation metadata is associated with the content item 1400. By selecting the overlay indicators 1410, 1420 when they indicate that metadata information is associated with the content item 1400, the metadata information of various formats can be displayed for viewing and/or modification by the user. Selecting the second overlay indicator 1420 when it indicates geolocation metadata is associated with the content item 1400 can display a map showing the location indicated by the metadata with street address, latitude/longitude/altitude or other geolocation information. When the metadata is displayed by selecting the overlay indicators 1410, 1420, the system can enable the user to modify fields of the displayed metadata.

Before sharing/exporting selected content, the user can elect to modify or remove the metadata information associated with a content item manually or by using predetermined profiles or both. Manual modification of the metadata information for an individual content item 1400 can be done when the metadata information is displayed for that content item using the overlay indicators 1410, 1420. Users can also create any number of customized profiles for metadata modification. These customized metadata profiles can include, for example, a custom location for all shared content, preset taken by information, comments, website address, copyright and other metadata information available in EXIF, IPTC, XMP or other metadata fields. The geolocation, directional and altitude data can also be modified or added manually or by using customized profiles.

FIG. 15 illustrates an individual content item 1500 and its associated metadata. In this example, the content item 1500 has associated geolocation metadata 1510, associated EXIF format metadata 1520, associated IPTC format metadata 1530 and associated XMP format metadata 1540. The latitude and longitude data can be modified or added by manipulating a pin 1512 to a specific location on a map and/or by entering a specific street address 1514. The altitude and other geolocation information can also be modified or deleted. Specific EXIF metadata fields 1522 can be modified or deleted, or a complete removal option 1524 can be selected to remove all metadata in all fields of the EXIF file 1520 and/or to delete the entire EXIF file 1520. Specific IPTC metadata fields 1532 can be modified or deleted, or a complete removal option 1534 can be selected to remove all metadata in all fields of the IPTC file 1530 and/or to delete the entire IPTC file 1530. Specific XMP metadata fields 1542 can be modified or deleted, or a complete removal option 1544 can be selected to remove all metadata in all fields of the XMP file 1540 and/or to delete the entire XMP file 1540. A visual watermark 1502 can be added to the content item 1500 indicating that associated metadata information has been modified by the system. The visual watermark 1502 can be an option controllable by the user, and the user can be enabled to customize graphic or text to be used as the watermark 1502.

When selected content items are shared/exported, if no modification profile has been selected then the content will be shared with no further metadata modification. A profile can be created to modify specific metadata fields automatically or manually.

A default profile can be selected or created for the system to remove or modify all, or specific metadata fields associated with content items before they are shared. For example, a standard profile for removing all metadata for any shared content can be the default profile option. Other standard profile options can include, but are not limited to, removing geolocation data, removing date and time data, adding or overwriting taken by data and/or adding copyright data. An unlimited number of profiles can be created or selected by the user to be automatically applied to any content that is shared from the device or application, and different profiles can be used for different types of content or in different situations. In other words, once an automatic profile has been selected, it can be applied to all content as it is shared, unless the profile has been set to show a decision prompt when content is shared.

A common use for modifying or adding geolocation metadata as an automatic profile is for sharing artwork and photography on photo sharing and social network sites and automatically providing business address information. Automatic profiles can be created for EXIF, IPTC, XMP or other format metadata that include automatically modifying and removing specific metadata fields, or deleting the entire metadata file and its contents. Geolocation metadata is often stored in EXIF metadata fields, so use of an automatic profile to remove all geolocation data from content as it is shared would include deleting any geolocation metadata in an associated EXIF metadata file. When a profile has been implemented by the system, it will automatically apply to all content items to which it is associated when that content is selected and/or exported and/or shared from the device. For example: text, instant message, email, internet, website, online storage, social network, local storage, file transfer and other methods for transferring digital content.

Figure 16:
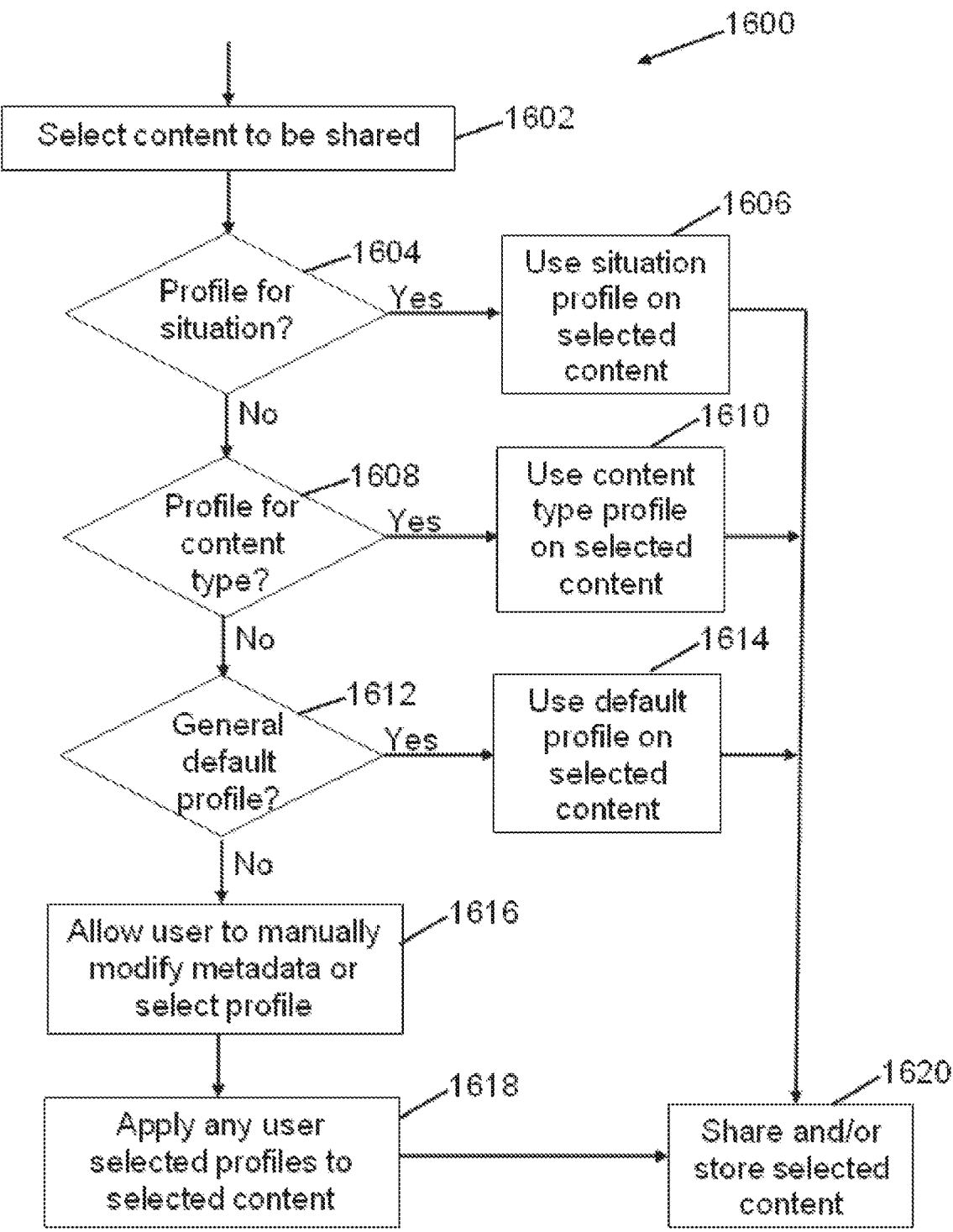
FIG. 16 illustrates an exemplary profile control flow diagram for an embodiment of the metadata control and management system.

FIG. 16 shows an exemplary profile control flow diagram 1600 for an embodiment of the metadata control and management system. At block 1602 the user has selected content to be shared or content for metadata modification using an input mechanism of the system. At block 1604, the system determines if there is a profile for the particular situation. If there is an applicable preselected profile for the situation, then at block 1606 a metadata modification component applies the situation profile to the content and at block 1620 the content is shared, exported and/or saved with the modified metadata. If there is not an applicable preselected profile for the situation, then control moves to block 1608.

At block 1608, the metadata modification component determines if there is a profile for the particular content type to be shared. If there is an applicable preselected profile for the content type, then at block 1610 the metadata modification component applies the content type profile to the content and at block 1620 the content is shared, exported and/or saved with the modified metadata. If there is not an applicable preselected profile for the content type, then control moves to block 1612.

At block 1612, the metadata modification component determines if there is a preselected general default profile to be applied to content before it is shared. If there is a preselected general default profile, then at block 1614 the metadata modification component applies the default profile to the content and at block 1620 the content is shared, exported and/or saved with the modified metadata. If there is not a preselected general default profile, then control moves to block 1616.

At block 1616, the metadata modification component allows the user to manually modify the metadata associated with the selected content or to select one or more profiles to be used on the content. At block 1618, the metadata modification component applies any user selected profiles to the metadata associated with the content. Then at block 1620 the content is shared, exported and/or saved with the modified or unmodified metadata.

Figure 17:
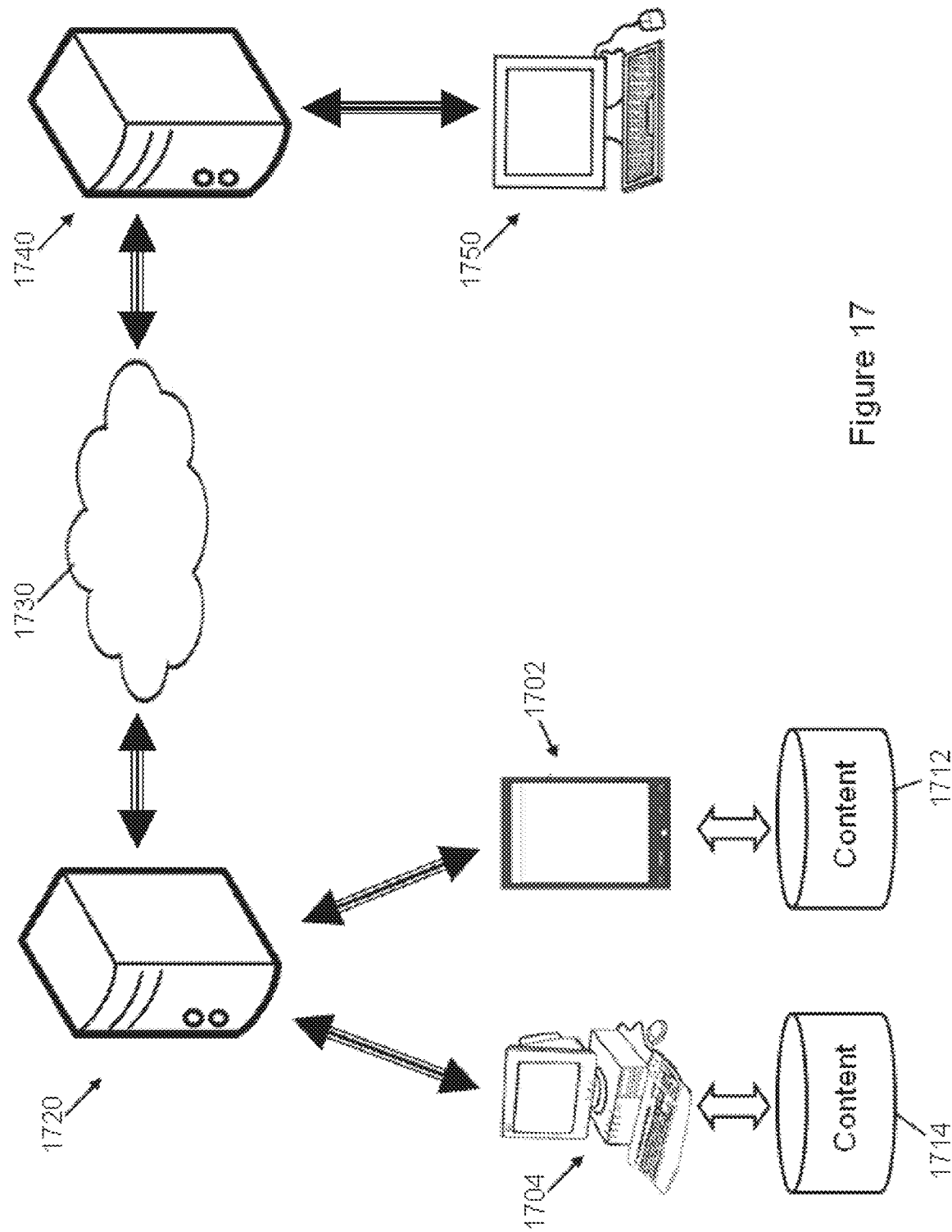
FIG. 17 illustrates an exemplary environment for use of the metadata control and management system.

FIG. 17 illustrates an exemplary environment for use of the metadata control and management system. A plurality of electronic devices, including a computer 1704 and a smart phone 1702 can communicate with one or more server systems 1720. Each of the user devices 1702, 1704 includes input and output mechanisms. For example, input mechanisms can include keyboard, mouse, touch screen, pointing device, etc.; and output mechanisms can include display screen, printer, etc. The server systems 1720 can be phone system service providers, internet service providers or other types of service providers enabling access to other electronic devices and networks. The smart phone 1702 stores and creates content 1712 stored in memory, and the computer 1704 stores and creates content 1714 stored in memory. Some of the content 1712, 1714 can contain or be associated with metadata information. The devices 1712, 1714 can share content with one another through the server 1720. The server 1720 can also communicate with wide area networks 1730, such as the internet. Other servers, such as the server 1740 can also communicate with the wide area network 1730 and with a local device 1750. The devices 1702, 1704 and 1750 can share content through the wide area network 1730. The metadata control and management system can be used to control the metadata that accompanies the content shared between these devices. This is only one exemplary environment, and this metadata system can be used in numerous environments known by those of skill in the art.

While exemplary embodiments incorporating the principles of the present invention have been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A smart phone comprising:
   a camera configured to capture sets of image data, wherein each of the sets of image data corresponds to a photo image or a video image, and wherein the captured sets of image data have associated metadata that includes a plurality of metadata parameters;
   a memory configured for storage of the captured sets of image data and storage of the associated metadata;
   a global positioning system (GPS) device; and
   a touch screen;
   wherein the smart phone is configured to export portions of the sets of image data with other users via a plurality of sharing mechanisms, wherein the plurality of sharing mechanisms include text messaging, email messaging and sharing via one or more social networks;
   wherein the memory is further configured to store a plurality of different profiles, wherein each of the plurality of different profiles includes profile instructions regarding metadata control of the associated metadata corresponding to the at least one of the plurality of sharing mechanisms;
   wherein the smart phone is further configured to generate interface screens for display via the touch screen and to receive user instructions based on touch screen interactions, and wherein the interface screens facilitate:
   selective configuration of the GPS device, via the touch screen interactions, that indicates whether to automatically capture geolocation data associated with the captured sets of image data, wherein the metadata parameters corresponding to the at least one of the captured sets of image data includes the geolocation data;
   display, via the touch screen, thumbnails of the captured sets of image data;

selection of selected image data, via the touch screen interactions, based on selection of a corresponding one of the thumbnails;

display, via the touch screen, of the selected image data in conjunction with at least one metadata icon;

selection, via the touch screen interactions, of the at least one metadata icon;

display, via the touch screen, of at least a portion of the metadata parameters corresponding to the selected image data, the at least the portion of the metadata parameters corresponding to the selected image data including at least one map indicating the geolocation data;

modification, via the touch screen interactions, of selected ones of the metadata parameters corresponding to the selected image data, wherein when the selected ones of the metadata parameters include the geolocation data, modification of selected ones of the metadata parameters includes selection of modified geolocation data to be associated with the selected image data, and wherein when the selected ones of the metadata parameters include a date indicating when the selected image data was captured, modification of selected ones of the metadata parameters includes selection of a modified date to be associated with the selected image data; and selection, via the touch screen interactions, of a selected one of the plurality of sharing mechanisms to export the selected image data;

wherein the smart phone is further configured to:
automatically select a relevant profile of the plurality of different profiles corresponding to the selected one of the plurality of sharing mechanisms, and to modify the associated metadata for the selected image data in accordance with profile instructions associated with the relevant profile to generate modified metadata for the selected image data, wherein the memory retains the storage of the associated metadata without modification; and export of the selected image data and the modified metadata via the selected one of the plurality of sharing mechanisms.

2. The smart phone of claim 1, wherein the profile instructions associated with the relevant profile include instructions associated with the geolocation data.

3. The smart phone of claim 2, wherein the instructions associated with geolocation data indicate a modification to the geolocation data.

4. The smart phone of claim 2, wherein the instructions associated with geolocation data indicate removal of the geolocation data when the selected one of the plurality of sharing mechanisms corresponds to a first sharing mechanism of the plurality of sharing mechanisms.

5. The smart phone of claim 4, wherein the instructions associated with geolocation data indicate retaining the geolocation data when the selected one of the plurality of sharing mechanisms corresponds to a second sharing mechanism of the plurality of sharing mechanisms.

6. The smart phone of claim 5, wherein the smart phone is further configured to:
export of the selected image data and the associated metadata without modification via the second sharing mechanism of the plurality of sharing mechanisms.

7. The smart phone of claim 2, wherein the instructions associated with geolocation data indicate removal of the geolocation data when the relevant profile of the plurality of different profiles corresponds to a first profile of the plurality of different profiles.

8. The smart phone of claim 7, wherein the instructions associated with geolocation data indicate retaining the geolocation data when the relevant profile of the plurality of different profiles corresponds to a second profile of the plurality of different profiles.

9. The smart phone of claim 8, wherein the smart phone is further configured to:
export of the selected image data and the geolocation data via the second sharing mechanism of the plurality of sharing mechanisms.

10. The smart phone of claim 1, wherein the export of the selected image data and the modified metadata over a network.

11. A method for use with a smart phone that includes a camera, a memory, a global positioning system (GPS) device and a touch screen, the method comprising:
capturing, via the camera, sets of image data, wherein each of the sets of image data corresponds to a photo image or a video image, and wherein the captured sets of image data have associated metadata that includes a plurality of metadata parameters;

storing, via the memory, the captured sets of image data and the associated metadata;

exporting portions of the sets of image data with other users via a plurality of sharing mechanisms, wherein the plurality of sharing mechanisms include text messaging, email messaging and sharing via one or more social networks;

store, via the memory, a plurality of different profiles, wherein each of the plurality of different profiles includes profile instructions regarding metadata control of the associated metadata corresponding to the at least one of the plurality of sharing mechanisms;

generating interface screens for display via the touch screen and to receive user instructions based on touch screen interactions, and wherein the interface screens facilitate:
selective configuring of the GPS device, via the touch screen interactions, that indicates whether to automatically capture geolocation data associated with the captured sets of image data, wherein the metadata parameters corresponding to the at least one of the captured sets of image data includes the geolocation data;

displaying, via the touch screen, thumbnails of the captured sets of image data;

selecting selected image data, via the touch screen interactions, based on selection of a corresponding one of the thumbnails;

displaying, via the touch screen, of the selected image data in conjunction with at least one metadata icon;

selecting, via the touch screen interactions, of the at least one metadata icon;

displaying, via the touch screen, of at least a portion of the metadata parameters corresponding to the selected image data, the at least the portion of the metadata parameters corresponding to the selected image data including at least one map indicating the geolocation data;

modifying, via the touch screen interactions, of selected ones of the metadata parameters corresponding to the selected image data, wherein when the selected ones of the metadata parameters include the geolocation data, modification of selected ones of the metadata parameters includes selection of modified geolocation data to be associated with the selected image data, and wherein when the selected ones of the metadata parameters include a date indicating when the selected image data was captured, modification of selected ones of the metadata parameters includes selection of a modified date to be associated with the selected image data; and selecting, via the touch screen interactions, of a selected one of the plurality of sharing mechanisms to export the selected image data;

automatically selecting a relevant profile of the plurality of different profiles corresponding to the selected one of the plurality of sharing mechanisms, and to modify the associated metadata for the selected image data in accordance with profile instructions associated with the relevant profile to generate modified metadata for the selected image data, wherein the memory retains storage of the associated metadata without modification; and exporting of the selected image data and the modified metadata via the selected one of the plurality of sharing mechanisms.

12. The method of claim 11, wherein the profile instructions associated with the relevant profile include instructions associated with the geolocation data.

13. The method of claim 12, wherein the instructions associated with geolocation data indicate a modification to the geolocation data.

14. The method of claim 12, wherein the instructions associated with geolocation data indicate removal of the geolocation data when the selected one of the plurality of sharing mechanisms corresponds to a first sharing mechanism of the plurality of sharing mechanisms.

15. The method of claim 14, wherein the instructions associated with geolocation data indicate retaining the geolocation data when the selected one of the plurality of sharing mechanisms corresponds to a second sharing mechanism of the plurality of sharing mechanisms.

16. The method of claim 15, further comprising:
Exporting the selected image data and the associated metadata without modification via the second sharing mechanism of the plurality of sharing mechanisms.

17. The method of claim 12, wherein the instructions associated with geolocation data indicate removal of the geolocation data when the relevant profile of the plurality of different profiles corresponds to a first profile of the plurality of different profiles.

18. The method of claim 17, wherein the instructions associated with geolocation data indicate retaining the geolocation data when the relevant profile of the plurality of different profiles corresponds to a second profile of the plurality of different profiles.

19. The method of claim 18, further comprising:
exporting the selected image data and the geolocation data via the second sharing mechanism of the plurality of sharing mechanisms.

20. The method of claim 11, wherein the export of the selected image data and the modified metadata over a network.

* * * * *